US012275177B2

(12) United States Patent
Yamanaka et al.

(10) Patent No.: US 12,275,177 B2
(45) Date of Patent: Apr. 15, 2025

(54) BASE FRAME FOR INJECTION MOLDING MACHINE

(71) Applicant: SUMITOMO HEAVY INDUSTRIES, LTD., Tokyo (JP)

(72) Inventors: Kazuma Yamanaka, Yokosuka (JP); Masaki Ogawa, Yokosuka (JP)

(73) Assignee: SUMITOMO HEAVY INDUSTRIES, LTD., Tokyo (JP)

( * ) Notice: Subject to any disclaimer, the term of this patent is extended or adjusted under 35 U.S.C. 154(b) by 258 days.

(21) Appl. No.: 17/930,411

(22) Filed: Sep. 7, 2022

(65) Prior Publication Data
US 2023/0001615 A1 Jan. 5, 2023

Related U.S. Application Data

(63) Continuation of application No. PCT/JP2021/014065, filed on Mar. 31, 2021.

(30) Foreign Application Priority Data

Mar. 31, 2020 (JP) .................................. 2020-064802
Mar. 31, 2020 (JP) .................................. 2020-064804

(51) Int. Cl.
*B29C 45/17* (2006.01)
*B29C 45/68* (2006.01)

(52) U.S. Cl.
CPC .... *B29C 45/681* (2013.01); *B29C 2045/1792* (2013.01); *B29C 2045/688* (2013.01)

(58) Field of Classification Search
CPC . B29C 45/64; B29C 45/1742; B29C 45/1761; B29C 2045/1765; B29C 2045/1767; B29C 45/17
See application file for complete search history.

(56) References Cited

U.S. PATENT DOCUMENTS 7,140,872 B2 11/2006 Nishimura et al.
7,429,169 B2 9/2008 Tsuji et al.
(Continued)

FOREIGN PATENT DOCUMENTS

JP 2000-084979 A 3/2000
JP 2000-289069 A 10/2000
(Continued)

OTHER PUBLICATIONS

PCT International Search Report of PCT/JP2021/014065 mailed May 25, 2021 by Japan Patent Office.
(Continued)

*Primary Examiner* — Thu Khanh T. Nguyen
(74) *Attorney, Agent, or Firm* — WTA Patents

(57) ABSTRACT

A base frame is used in an injection molding machine provided with a mold clamping unit having a platen, on which at least the mold clamping unit is placed and which supports the mold clamping unit. The base frame includes: a pair of main beams spaced apart from each other in a width direction of the base frame and extending side by side in a longitudinal direction of the base frame; and a platen attachment plate which is disposed on the main beams and to which the platen is attached, in which outer edge portions of the platen attachment plate in the longitudinal direction include welding points joined by welding to the main beams, and the platen attachment plate has a shape in which a length in the longitudinal direction is longer at an outer end than at an inside part in the width direction.

34 Claims, 12 Drawing Sheets

(56) References Cited

U.S. PATENT DOCUMENTS

2006/0263471 A1    11/2006  Tsuji et al.
2018/0370102 A1*   12/2018  Murata .................. B29C 45/64
2019/0168431 A1*   6/2019   Sugahara ............ B29C 45/1742

FOREIGN PATENT DOCUMENTS

| JP | 3631906 B2 * | 3/2005 | ......... B29C 45/1761 |
| JP | 2006-320948 A | 11/2006 | |
| JP | 2006-321181 A | 11/2006 | |
| WO | WO-2014046132 A1 * | 3/2014 | ............. B29C 45/17 |

OTHER PUBLICATIONS

Office Action of the corresponding DE 112021002107.9 mailed on Jul. 23, 2024.

\* cited by examiner

BASE FRAME FOR INJECTION MOLDING MACHINE

CROSS-REFERENCE TO RELATED APPLICATIONS

This is a bypass continuation of International PCT application number PCT/JP2021/014065 filed on Mar. 31, 2021, which claims priority to Japanese Patent Application No. 2020-064802 filed on Mar. 31, 2020, and Japanese Patent Application No. 2020-064804 filed on Mar. 31, 2020, which are incorporated by reference herein in their entirety.

BACKGROUND

Technical Field

Certain embodiments of the present invention relate to a base frame used in an injection molding machine provided with a mold clamping unit having a platen.

Description of Related Art

This type of base frame, which configures a pedestal for an injection molding machine, has, for example, a mold clamping unit and an injection unit placed thereon, and various external forces act due to the weight and operation of, for example, the mold clamping unit when the injection molding machine is used.

In relation thereto, the related art proposes "a mold clamping mechanism for an injection molding machine provided with a stationary platen on an injection molding machine base frame, in which a rib is provided on a lower portion of a surface of the stationary platen on a nozzle touch side and the stationary platen is supported by connecting the rib and a strut provided on the base frame" for the purpose of "suppressing a tilt of the stationary platen in the mold clamping mechanism for the injection molding machine".

Of these components, to be more specific as to the "base frame", as illustrated in, for example, FIGS. 2 and 3 of the related art, it is described that "a base frame 3 includes lower main pipes 32a and 32b disposed in parallel along a mold clamping axis and upper main pipes 31a and 31b disposed in parallel along the same mold clamping axis, and struts 34a and 34b connecting the upper and lower main pipes are provided substantially below both ends of a stationary platen 4. Further, a strut 30 supporting a rib 10 is provided below a leg portion of the rib 10", "the stationary platen 4 and the upper main pipe 31a and the upper main pipe 31b can be connected across a connecting plate 11, and it is possible to increase connection surface flatness or connection strength or to improve the operability of the connection work", and "the stationary platen 4 has the rib 10 on the nozzle touch side, and the strut 30 is provided below the rib 10, and the rib 10 and the strut 30 are connected directly or via the plate 11."

SUMMARY

One base frame according to an embodiment of the invention is a base frame used in an injection molding machine provided with a mold clamping unit including a platen, on which at least the mold clamping unit is placed and which supports the mold clamping unit, the base frame including: a pair of main beams spaced apart from each other in a width direction of the base frame and extending side by side in a longitudinal direction of the base frame; and a platen attachment plate which is disposed on the main beams and to which the platen is attached, in which outer edge portions of the platen attachment plate in the longitudinal direction include welding points joined by welding to the main beams, and the platen attachment plate has a shape in which a length in the longitudinal direction is longer at an outer end than at an inside part in the width direction.

Another base frame according to an embodiment of the invention is a base frame used in an injection molding machine provided with a mold clamping unit including a platen, on which at least the mold clamping unit is placed and which supports the mold clamping unit, the base frame including: a pair of main beams spaced apart from each other in a width direction of the base frame and extending side by side in a longitudinal direction of the base frame; a platen attachment plate which is disposed on the main beams by being joined by welding and to which the platen is attached; and a connecting beam extending between the pair of main beams in the width direction and interconnecting the main beams on a frame installation surface side of the platen attachment plate.

DETAILED DESCRIPTION

For example, in the "base frame 3" as described in the related art, a decline in durability may arise on the condition that an external force or the like in the event of fall-direction deformation of the "stationary platen 4" repeatedly acts on the "plate 11".

In order to cope with this, it is conceivable to increase a dimension such as the surface area of the "plate 11" in order to resist the above external force, but the dimensions of the "plate 11" cannot be simply increased due to constraints in terms of, for example, the required space in the "base frame 3".

In addition, for example, in the "base frame 3" as described above, the durability of the "base frame 3" declines as the external force or the like in the event of the fall-direction deformation of the "stationary platen 4" repeatedly acts on the "upper main pipes 31a and 31b" via the "plate 11".

The present invention has been made to solve such problems, and it is desirable to provide a base frame for an injection molding machine capable of durability improvement.

According to the above base frame, durability can be improved.

Hereinafter, an embodiment of the present invention will be described in detail with reference to the drawings.

Figure 1:
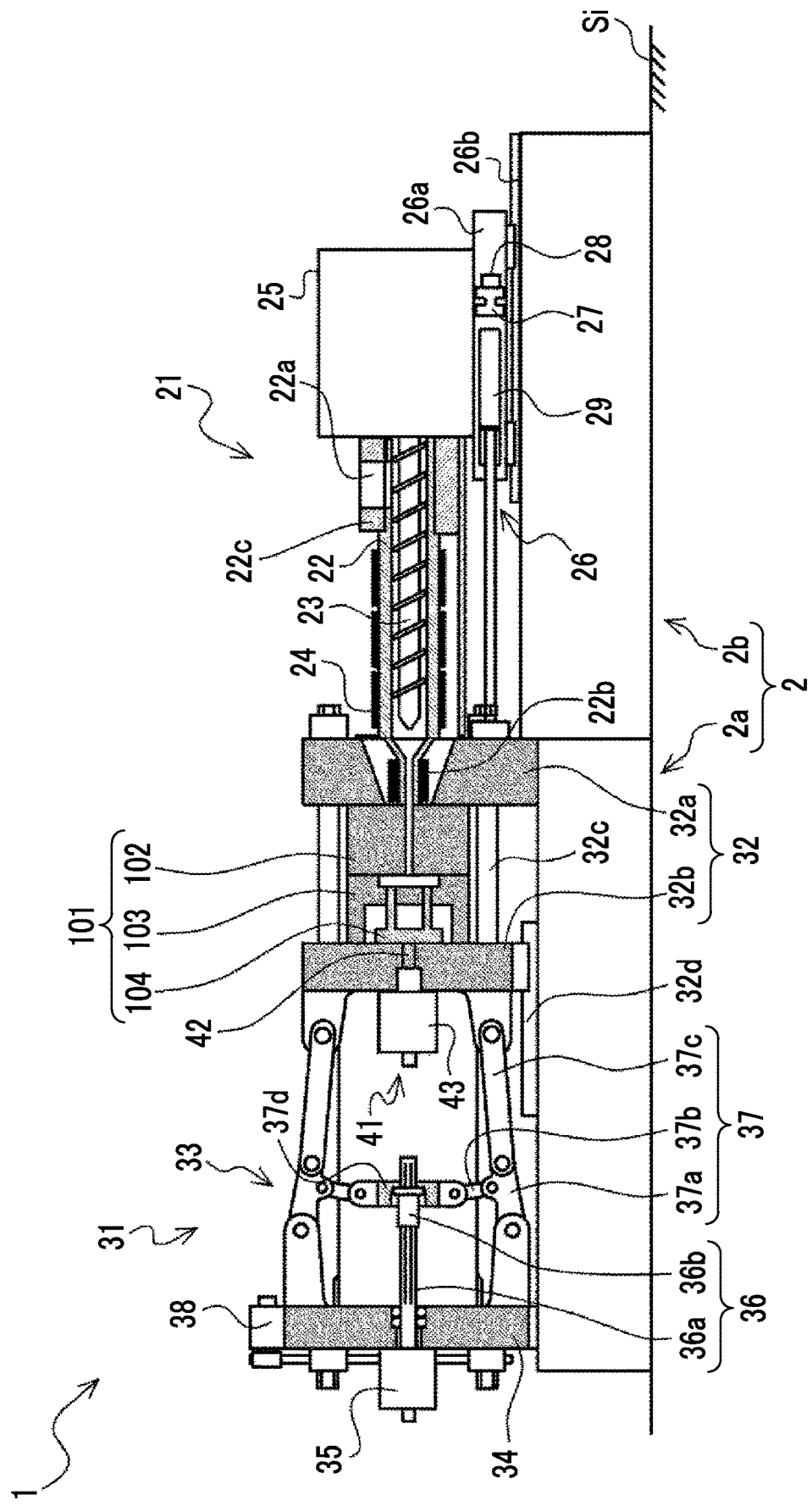
FIG. 1 is a cross-sectional view illustrating an example of an injection molding machine provided with a base frame according to an embodiment of the present invention.

As illustrated in FIG. 1, a base frame 2 of the embodiment of the present invention is installed on a frame installation surface Si, various devices of an injection molding machine 1 are placed thereon, and the base frame 2 can be used as a pedestal supporting the devices.

Although details of the injection molding machine 1 will be described later, the injection molding machine 1 generally includes an injection unit 21 melting a molding material and injecting the molding material into a mold unit 101 via a screw 23 disposed inside rotating and moving forward and a heater 24 disposed therearound performing heating, a moving unit 26 displacing the injection unit 21 forward and rearward with respect to the mold unit 101, a mold clamping unit 31 opening and closing the mold unit 101 between a mold clamping state and a mold opening state, and an ejector unit 41 ejecting a molding product from the mold unit 101 in the mold opening state. It should be noted that in the illustrated example, the mold unit 101 has a stationary mold 102 and a movable mold 103 having a partition-formed cavity inside in the mold clamping state and a movable member 104 such as an ejector pin displaced by the ejector unit 41 to push out and eject the molding product. The mold unit 101 can be appropriately attached to the injection molding machine 1 and be replaced in accordance with, for example, the shape of the molding product to be manufactured, and the mold unit 101 is not regarded as a part of the injection molding machine 1.

Of these components, the mold clamping unit 31 mainly has a platen 32 disposed so as to sandwich the mold unit 101 from both sides and a platen operation mechanism 33 making the platen 32 movable. The platen 32 includes a stationary platen 32a positioned between the injection unit 21 and the mold unit 101 and having a lower end portion fixed to the base frame 2 and a movable platen 32b positioned across the mold unit 101 from the stationary platen 32a and displaceable toward and away from the stationary platen 32a. As for the mold unit 101 positioned between the stationary platen 32a and the movable platen 32b, the stationary mold 102 is attached to the stationary platen 32a side, and the movable mold 103 is attached to the movable platen 32b side. In addition, the mold clamping unit 31 is provided with one or a plurality of tie bars 32c extending from the stationary platen 32a toward a rear platen 34 (described later) to connect the stationary platen 32a and the rear platen 34. Although the displacement of the movable platen 32b away from and toward the stationary platen 32a is guided by the tie bar 32c in this example, the tie bar 32c may not guide the displacement.

It should be noted that at the position where the movable platen 32b is away from the stationary platen 32a, the movable mold 103 of the mold unit 101 is open from the stationary mold 102, which is the mold opening state. By bringing the movable platen 32b close to the stationary platen 32a from this position of separation, the movable mold 103 is closed with respect to the stationary mold 102 to result in a mold closing state. By bringing the movable platen 32b closer to the stationary platen 32a, the movable mold 103 is pressed against the stationary mold 102 to result in the mold clamping state. Here, a direction toward the stationary platen 32a to which the stationary mold 102 of the mold unit 101 is attached is a front side, and a direction away from the stationary platen 32a is a rear side. As for many parts of the mold clamping unit 31 excluding the stationary platen 32a, in FIG. 1, a rightward direction toward the stationary platen 32a is the front side, and a leftward direction away from the stationary platen 32a is the rear side.

For example, the stationary platen 32a with the lower end portion fixed and attached to the base frame 2 holds the stationary mold 102 of the mold unit 101, and thus a load corresponding to the weight of the stationary mold 102 acts. In addition, by the tie bar 32c being attached to, for example, the four corners therearound, the stationary platen 32a may be deformed due to the tensile force acting on the tie bar 32c when, for example, the mold unit 101 is sandwiched between the stationary platen 32a and the movable platen 32b by the platen operation mechanism 33 to result in the mold clamping state. Along with this, various external forces act on the base frame 2 to which the stationary platen 32a is attached. In addition, the rear platen 34 and the like are also placed on the base frame 2 and, for example, a load attributable to the weight of the rear platen 34 also acts. The embodiment described here is mainly to improve the durability of the base frame 2 on which such an external force is capable of acting.

One Base Frame

Figure 2:
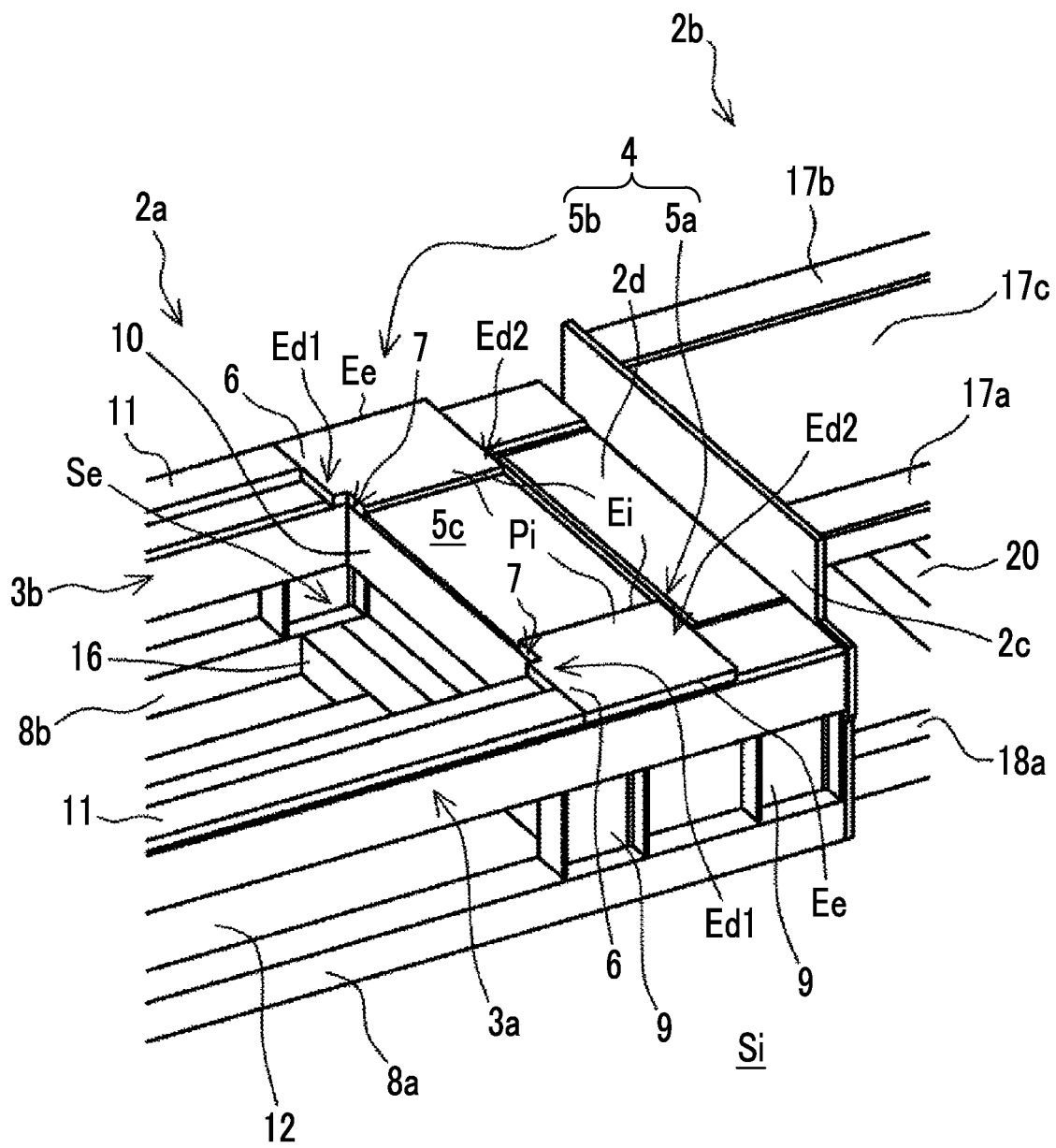
FIG. 2 is a partially enlarged perspective view illustrating the base frame taken out of the injection molding machine of FIG. 1.
Figure 3:
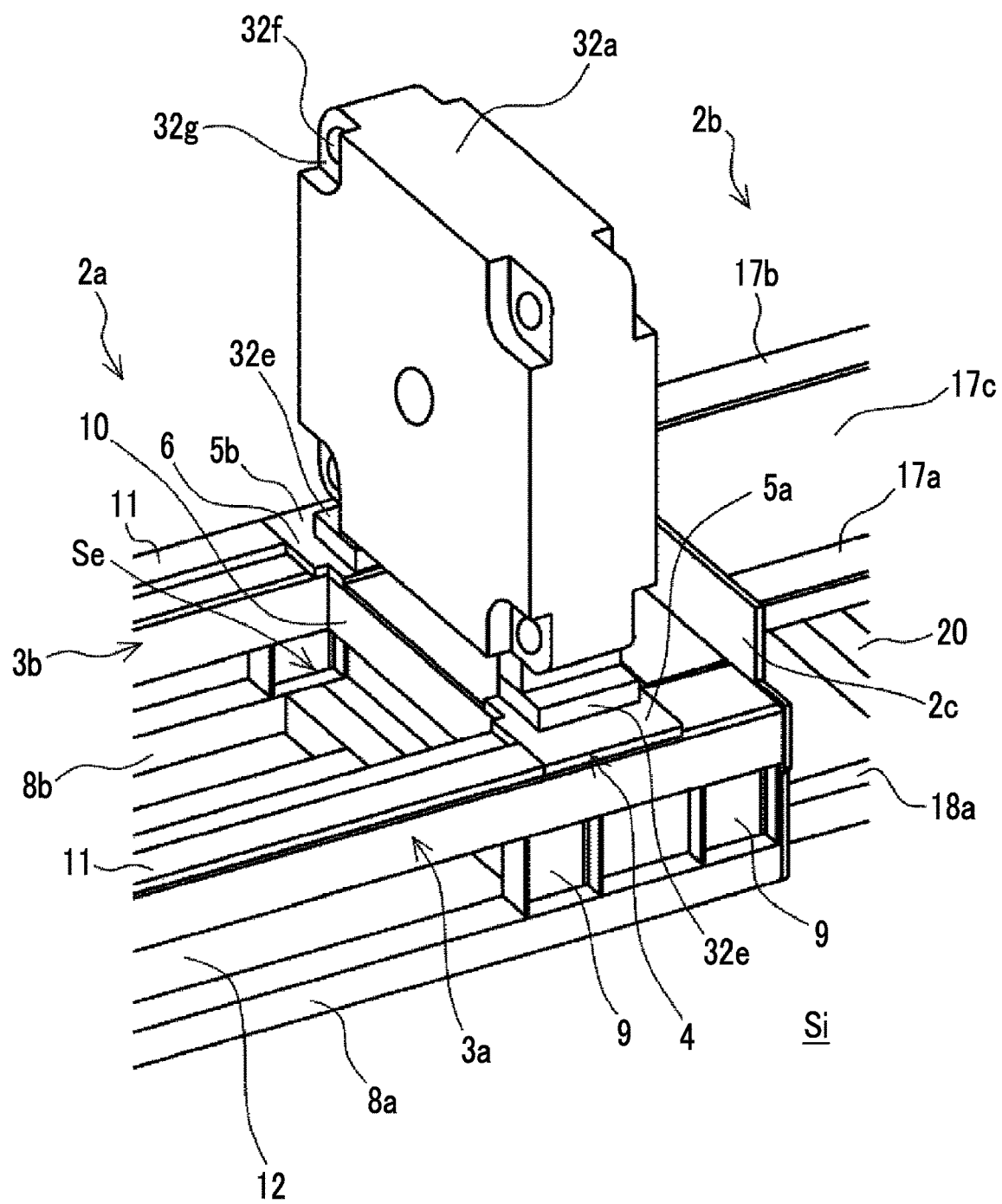
FIG. 3 is a partially enlarged perspective view illustrating the base frame of FIG. 2 together with a stationary platen of a mold clamping unit.
Figure 4A:
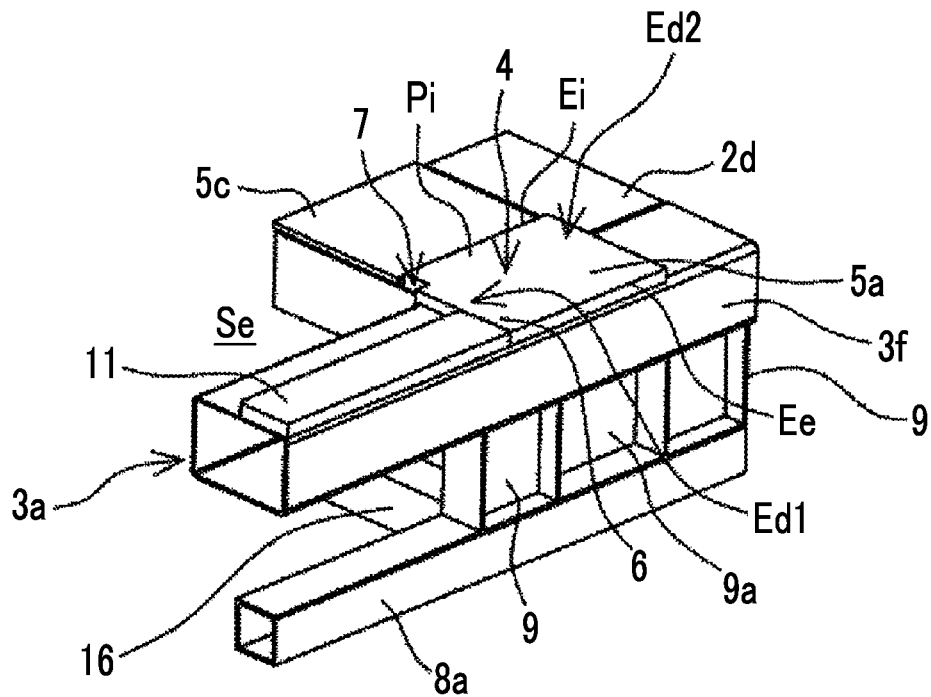
FIGS. 4A and 4B are perspective views from a different direction illustrating a main part taken out with a part of the base frame of FIG. 2 cut out.
Figure 4B:
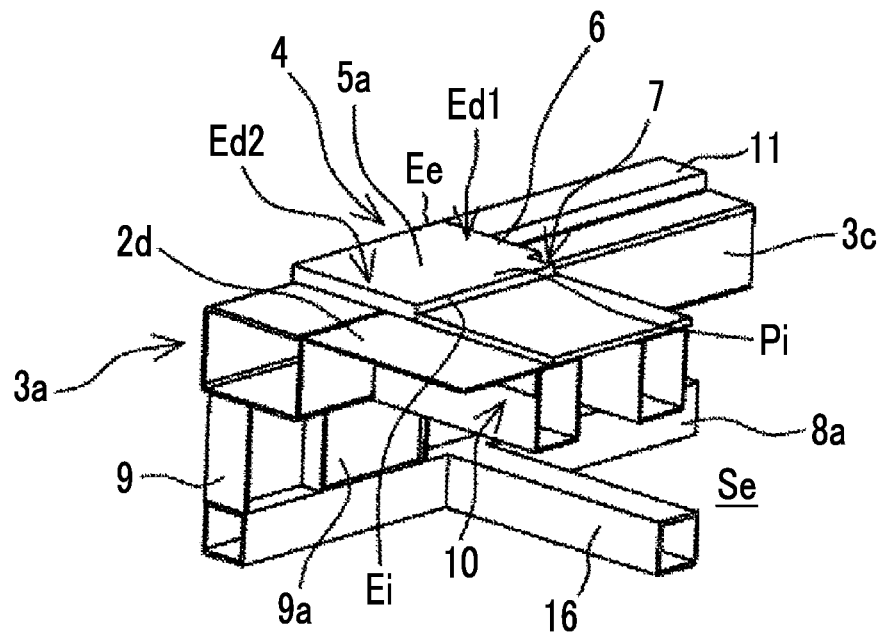

The base frame 2 of the illustrated embodiment is a structure that combines members including a plurality of beams and struts as illustrated in the partially enlarged view of FIG. 2. The illustrated base frame 2 includes a mold clamping unit side frame 2a where the mold clamping unit 31 is placed. As illustrated in FIG. 3, the stationary platen 32a is attached onto the mold clamping unit side frame 2a. It should be noted that the base frame 2 further includes an injection unit side frame 2b where the injection unit 21 is placed, the injection unit side frame 2b is connected to an end portion of the mold clamping unit side frame 2a, and the injection unit side frame 2b will be described in detail later. It should be noted that although not illustrated, there is also a base frame where a mold clamping side frame and an injection unit side frame are integrated, and not only a mold clamping unit but also an injection unit and the like are placed on such a base frame.

The mold clamping unit side frame 2a mainly includes a pair of main beams 3a and 3b spaced apart from each other in a width direction of the base frame 2 (direction perpendicular to the direction in which the stationary platen 32a and the movable platen 32b of the mold clamping unit 31 separate and approach in a horizontal plane) and extending side by side in a longitudinal direction of the base frame 2 (direction in which the stationary platen 32a and the movable platen 32b of the mold clamping unit 31 separate and approach), and a platen attachment plate 4 disposed on the main beams 3a and 3b near the end portion on the injection unit side frame 2b side. In the present embodiment, the platen attachment plate 4 is divided in the width direction of the base frame 2 and is configured to include two side plate members 5a and 5b disposed on the main beams 3a and 3b, respectively. It should be noted that as illustrated in FIG. 2, a center plate member 5c thinner than, for example, the side plate members 5a and 5b is disposed between the two side plate members 5a and 5b in the width direction, and width-direction outer ends of the center plate member 5c are welded to width-direction inner ends Ei of the side plate members 5a and 5b.

The stationary platen 32a is attached to the platen attachment plate 4 as illustrated in FIG. 3. More specifically, in the illustrated example, the stationary platen 32a as a whole has a substantially square or rectangular plate shape with the four corners substantially rounded in a front view, and a bottom surface of the lower end portion of the stationary platen 32a is provided with a pair of leg portions 32e having, for example, a block shape, spaced apart in the width direction of the base frame 2, protruding from the bottom surface, and having steps on the outside in the width direction. Each of the four corners of the plate-shaped stationary platen 32a is formed with a through-hole 32f through which the tie bar 32c is passed and a recessed portion 32g where the surface part around the through-hole 32f is recessed in relation to the other part. Meanwhile, as for the side plate members 5a of the platen attachment plate 4, platen fixing parts used for fixing to the leg portions 32e are provided at positions corresponding to the arrangement positions of the leg portions 32e. Although not illustrated, the platen fixing part can be, for example, a hole portion where a bolt used for fastening to the leg portion 32e of the stationary platen 32a is inserted. However, the method of attaching the stationary platen 32a is not limited thereto. It should be noted that although not illustrated in FIG. 3, the movable platen 32b is positioned on the side opposite to the injection unit side frame 2b across the stationary platen 32a in the longitudinal direction of the base frame 2 and is spaced apart from the stationary platen 32a, and this interval changes in accordance with the operation of the platen operation mechanism 33.

The platen attachment plate 4 is welded at welding points and is joined to the main beams 3a and 3b. The welding points between the platen attachment plate 4 and the main beams 3a and 3b include at least one of outer edge portions Ed1 and Ed2 of the platen attachment plate 4, which are in the longitudinal direction of the base frame 2 as illustrated in FIGS. 2, 4A and 4B, and 5A to 5C. Although the welding part of the outer edge portion Ed1 and/or Ed2 can be changed as appropriate, in this example, in the outer edge portion Ed1 of the platen attachment plate 4 on the movable platen 32b side, the width-direction insides thereof are partially welded to the main beams 3a and 3b and, in the outer edge portion Ed2 of the platen attachment plate 4 on the injection unit 21 side, the entire part of contact with the main beams 3a and 3b is welded. In addition, in the present embodiment, the side plate members 5a and 5b of the platen attachment plate 4 are wholly joined by welding to the main beams 3a and 3b not only in the outer edge portions Ed1 and Ed2 but also at outer ends Ee positioned outside in the width direction of the base frame 2, and thus the outer end Ee is also a welding point. The outer edge portions Ed1 and Ed2 and the outer ends Ee of the platen attachment plate 4 can be regarded as welding points insofar as the outer edge portions Ed1 and Ed2 and the outer ends Ee of the platen attachment plate 4 are at least in part welded to the main beams 3a and 3b.

In a case where a platen attachment plate has such a welding point in an outer edge portion, various external forces from a stationary platen may act to result in a welding crack at the welding point. More specifically, in the stationary platen that has a lower end portion fixed to a base frame with tie bars attached at the four corners therearound, when, for example, a mold unit is put into a mold clamping state, with the lower end portion and the four corners restrained, deformation may occur such that the middle portion against which the mold unit is pressed falls toward a movable platen while bulging toward an injection unit. At this time, on the platen attachment plate to which the leg portion in the lower end portion of the stationary platen is attached, an external force acts with the deformation of the stationary platen, particularly in the direction in which the longitudinal outer edge portion is pulled away from a main beam, which may lead to a welding crack in the outer edge portion. This becomes conspicuous in a case where high-cycle molding is performed to repeatedly manufacture a molding product in a relatively short cycle.

In order to mitigate the stress at the welding point attributable to the external force as described above and to prevent such a welding crack, it is conceivable to longitudinally lengthen the platen attachment plate to move the outer edge portion away from where the stationary platen is attached and to increase a dimension such as the surface area of the platen attachment plate so as to be capable of sufficiently withstanding the external force.

However, the lower space between the stationary platen and the movable platen needs to be left empty when taking out the molding product molded in the mold unit and, for such a reason, the dimension of the platen attachment plate cannot simply be increased.

However, in the present embodiment, the platen attachment plate 4 has a shape in which the length in the longitudinal direction is longer at the outer ends Ee than at width-direction inside parts Pi of the base frame 2. As a result, the welding points of the outer edge portions Ed1 and Ed2 of the platen attachment plate 4 can be positioned sufficiently away from the platen fixing parts at least in the vicinity of the outer ends Ee, and it is possible to effectively suppress welding cracks at the welding points. In addition, the width-direction inside parts Pi of the platen attachment plate 4 have a relatively short length in the longitudinal direction, and a required space is easily ensured in the vicinity of the outer edge portion Ed1 and/or Ed2 at the inside part Pi. In this example, the platen attachment plate 4 is configured to include the side plate members 5a and 5b, and the longitudinal lengths of the inside parts Pi of the platen attachment plate 4 can be the longitudinal lengths at the width-direction inner ends Ei of the side plate members 5a and 5b. It should be noted that the longitudinal length of the outer end Ee or the inside part Pi of the platen attachment plate 4 can be a length measured along the longitudinal direction of the base frame 2.

More preferably, at least one of the outer edge portions Ed1 and Ed2 of the platen attachment plate 4 has a protruding edge portion 6, which protrudes longitudinally outward beyond the inside part Pi, at the outside part including the width-direction outer end Ee described above. By the protruding edge portion 6 being formed at the width-direction outside part of the platen attachment plate 4, the points of welding to the main beams 3a and 3b provided in the protruding edge portion 6 are more reliably spaced apart from the platen fixing parts while the required space on the inside in the width direction is ensured.

In the present embodiment, of the outer edge portions Ed1 and Ed2 of the platen attachment plate 4, only the outer edge portion Ed1 positioned on the movable platen 32b side is formed with the protruding edge portion 6. As a result, at the position adjacent to the outer edge portion Ed1 on the movable platen 32b side at the inside part Pi of the platen attachment plate 4, an empty space 7 recessed in, for example, a rectangular shape in a plan view is formed inside the protruding edge portion 6 in the longitudinal direction. The empty space 7 configures a part of a molding product take-out space Se, which is the lower space between the stationary platen 32a and the movable platen 32b. In this case, when the molding product is molded in the mold unit 101 and is then dropped downward from the mold unit 101 in the mold opening state and taken out, it is possible to further prevent the platen attachment plate 4 from affecting the molding product take-out. As for this platen attachment plate 4, the side surface of the outer edge portion Ed1 that faces the empty space 7 is L-shaped in a plan view.

Figure 6A:
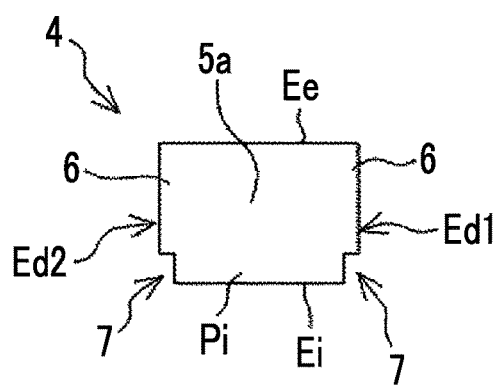
FIGS. 6A and 6B are plan views illustrating a modification example of a side plate member of a platen attachment plate of the base frame.

It should be noted that as in the modification example that is illustrated in FIG. 6A, it is also possible to form the protruding edge portions 6 on both the outer edge portions Ed1 and Ed2 of the side plate member 5a. In the outer edge portions Ed1 and Ed2 in FIG. 6A, the outside parts of the platen attachment plate 4 in the width direction are formed with the protruding edge portions 6 protruding longitudinally outward and, in this case as well, it is preferable that the inside part Pi is provided with the empty space 7 recessed in a rectangular shape or the like inside the protruding edge portion 6 in the longitudinal direction. In the example illustrated in FIG. 6A as well, as is apparent from the drawing, the longitudinal length is longer at the width-direction outer end Ee than at the width-direction inside part Pi (inner end Ei) of the platen attachment plate 4.

Figure 6B:
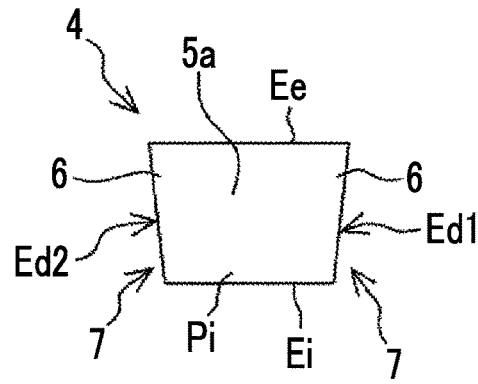

Although the protruding edge portion 6 has a side surface parallel to the width direction in a plan view and the longitudinal length of the protruding edge portion 6 is constant over the entire width direction in the above description, the longitudinal length of the protruding edge portion 6 may, for example, change in the width direction smoothly or stepwise. For example, in the modification example that is illustrated in FIG. 6B, the protruding edge portion 6 is formed on each of the outer edge portions Ed1 and Ed2 of the side plate member 5a, and the longitudinal length of the protruding edge portion 6 gradually decreases toward the inside in the width direction. This side plate member 5a is formed with the longitudinal length of the protruding edge portion 6 on each of the outer edge portions Ed1 and Ed2 gradually decreasing from the outer end Ee to the inner end Ei, and this side plate member 5a is trapezoidal in a plan view as a result.

Although FIGS. 6A and 6B illustrate only one side plate member 5a of the platen attachment plate 4, the other side plate member 5b is capable of being similar in shape to the side plate member 5a.

The width-direction length of the protruding edge portion 6 can be appropriately determined in view of the necessary size of the empty space 7, which becomes a part of, for example, the molding product take-out space Se, and other conditions. Depending on various conditions, the width-direction length of the protruding edge portion 6 being equal to the width of the main beam 3a as in the present embodiment or being shorter than the width of the main beam 3a may be preferable from the viewpoint of, for example, ensuring the required molding product take-out space Se.

From the viewpoint of, for example, also suppressing a welding crack in welding the inner ends Ei of the side plate members 5a and 5b and the width-direction outer ends of the center plate member 5c, it is preferable that the inner ends Ei of the side plate members 5a and 5b are positioned inside in the width direction so as to be somewhat away from the platen fixing parts. In this example, the inner ends Ei of the side plate members 5a and 5b are positioned so as to protrude inside, in the width direction, width-direction inside surfaces 3c of the main beams 3a and 3b where the side plate members 5a and 5b are disposed, respectively. It should be noted that in this example, the outer ends Ee of the side plate members 5a and 5b are substantially aligned with width-direction outside surfaces 3f of the main beams 3a and 3b in a plan view, and the outer end Ee is substantially coplanar with the outside surface 3f. Both the inner ends Ei and the outer ends Ee of the side plate members 5a and 5b may linearly extend in the longitudinal direction as in the illustrated embodiment.

Figure 7:
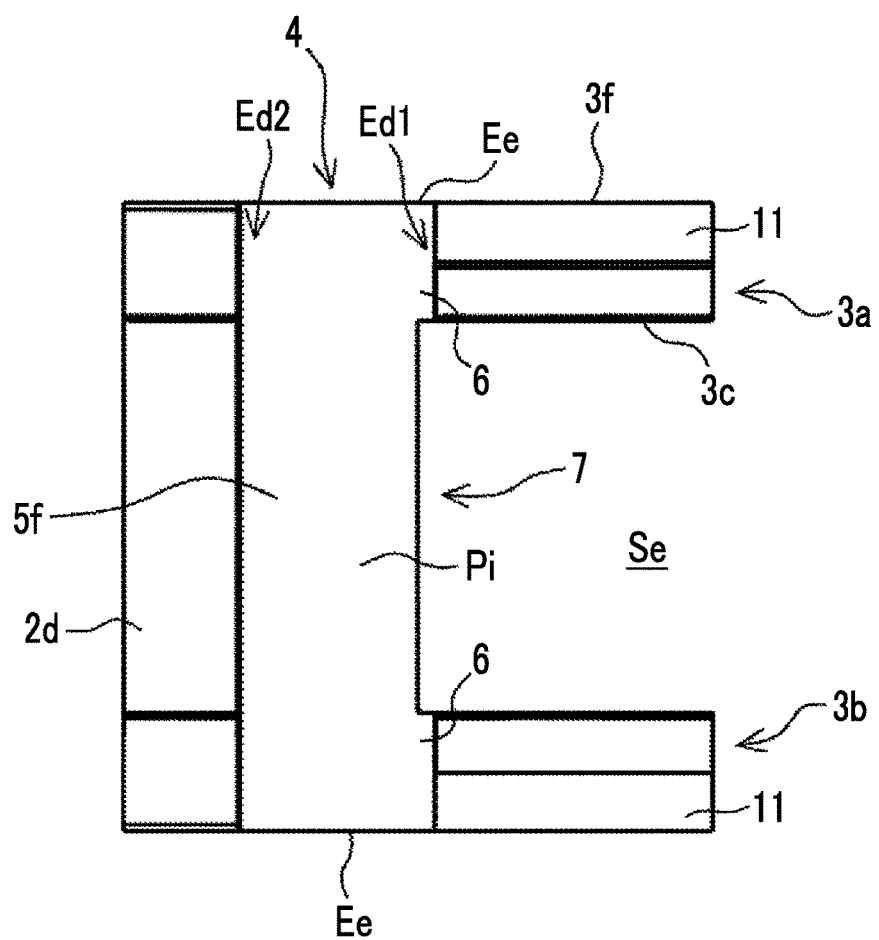
FIG. 7 is a plan view of the main part of the base frame illustrating a modification example of the platen attachment plate of the base frame.

In the modification example that is illustrated in FIG. 7, the platen attachment plate 4 has substantially the same configuration as the example described above except that the platen attachment plate 4 is configured to include a single and integrated erection plate member 5f bridging between the pair of main beams 3a and 3b instead of the two divided side plate members 5a and 5b described above. In FIG. 7, the erection plate member 5f extends over the entire width direction between the outside surfaces 3f of the main beams 3a and 3b in a plan view.

Also in the platen attachment plate 4 including the erection plate member 5f as illustrated in FIG. 7, by having a shape in which the longitudinal length is longer at the outer end Ee than at the width-direction inside part Pi, it is possible to effectively suppress welding cracks at the welding points of the outer edge portions Ed1 and Ed2 and to ensure the molding product take-out space Se or the like. In addition, also in the modification example that is illustrated in FIG. 7, it is preferable that at least one of the outer edge portions Ed1 and Ed2 of the platen attachment plate 4, for example, the outer edge portion Ed1 on the movable platen 32b side, has the protruding edge portion 6 protruding longitudinally outward beyond the inside part Pi at the outside part including the width-direction outer end Ee. As a result, the empty space 7 capable of configuring, for example, a part of the molding product take-out space Se is formed at a position adjacent to, for example, the outer edge portion Ed1 on the movable platen 32b side at the inside part Pi. Here, the longitudinal length of the inside part Pi can be measured at the width-direction inside part that lacks the protruding edge portion 6.

The mold clamping unit side frame 2a illustrated in the drawings further includes a pair of longitudinally extending frame base portions 8a and 8b disposed apart from the main beams 3a and 3b on the frame installation surface Si side of the pair of main beams 3a and 3b (lower side in a vertical direction) and a plurality of struts 9 provided so as to be interposed between the main beams 3a and 3b and the frame base portions 8a and 8b and extending in a height direction (vertical direction). It should be noted that although the frame base portions 8a and 8b are square pipes and the struts 9 are H-shaped steel in the illustrated example, the specific structures of the frame base portions 8a and 8b and the struts 9 can be changed as appropriate. The main beams 3a and 3b, the struts 9, and the frame base portions 8a and 8b can be mutually joined by welding.

It is preferable that the struts 9 are also disposed between the main beams 3a and 3b and the frame base portions 8a and 8*b* on the frame installation surface Si side of the platen attachment plate 4. In this case, the load that the platen attachment plate 4 receives from the stationary platen 32*a* is effectively supported by the struts 9.

Figure 5A:
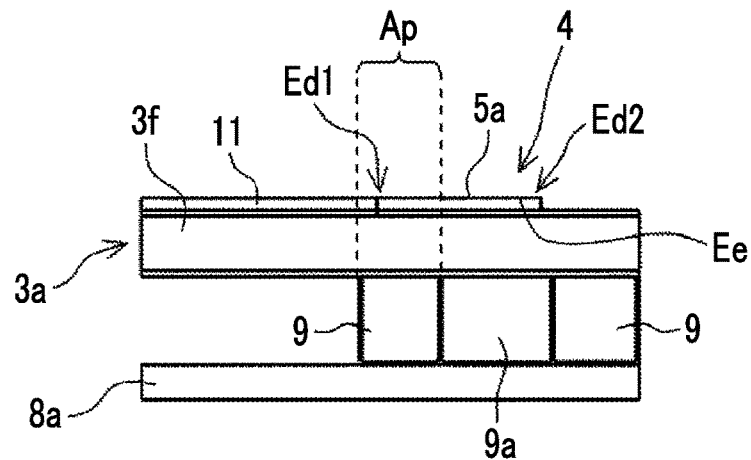
FIGS. 5A to 5C are front, rear, and plan views of the main part of the base frame illustrated in FIGS. 4A and 4B.
Figure 5B:
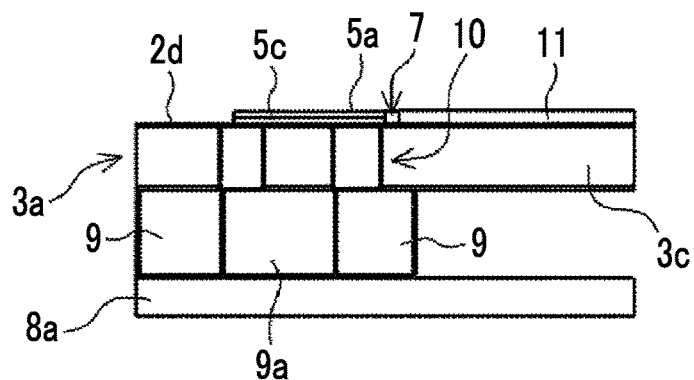
Figure 5C:
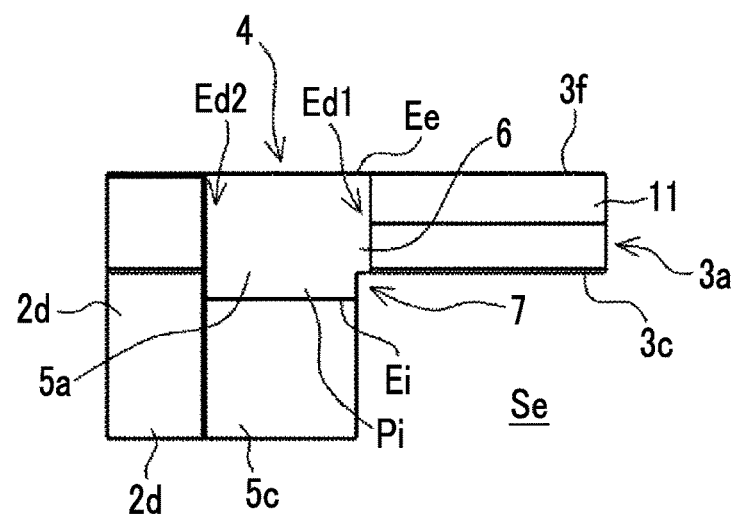

In this case in particular, it is preferable that the outer end Ee of the platen attachment plate 4 has a length overlapping a disposition region Ap of the strut 9 of the platen attachment plate 4 in the longitudinal direction as in the illustrated embodiment. In other words, preferably, as illustrated in FIG. 5A, the longitudinal length of the outer end Ee is determined such that at least a part of the longitudinal region of the outer end Ee of the platen attachment plate 4 overlaps at least a part of the disposition region Ap of the strut 9 in the longitudinal direction. In this manner, the load that the platen attachment plate 4 receives from the stationary platen 32*a* can be more effectively supported by the struts 9. In the present embodiment, two struts 9 are disposed on the frame installation surface Si side of the platen attachment plate 4 and, regarding the strut 9 on the movable platen 32*b* side (left side in FIG. 6A) as one of the two struts 9, the disposition region Ap and the region of the outer end Ee of the platen attachment plate 4 overlap in the longitudinal direction. Here, the region only has to overlap the disposition region Ap of at least one of the two struts 9. In some cases, it is preferable that the outer end Ee of the platen attachment plate 4 is, as in the present embodiment, elongated to the movable platen 32*b* side with a length not exceeding the disposition region Ap of the strut 9 on the frame installation surface Si side. It should be noted that between the two struts 9 on the frame installation surface Si side of the platen attachment plate 4, a plate material 9*a* is disposed to block the gap therebetween.

Figure 8:
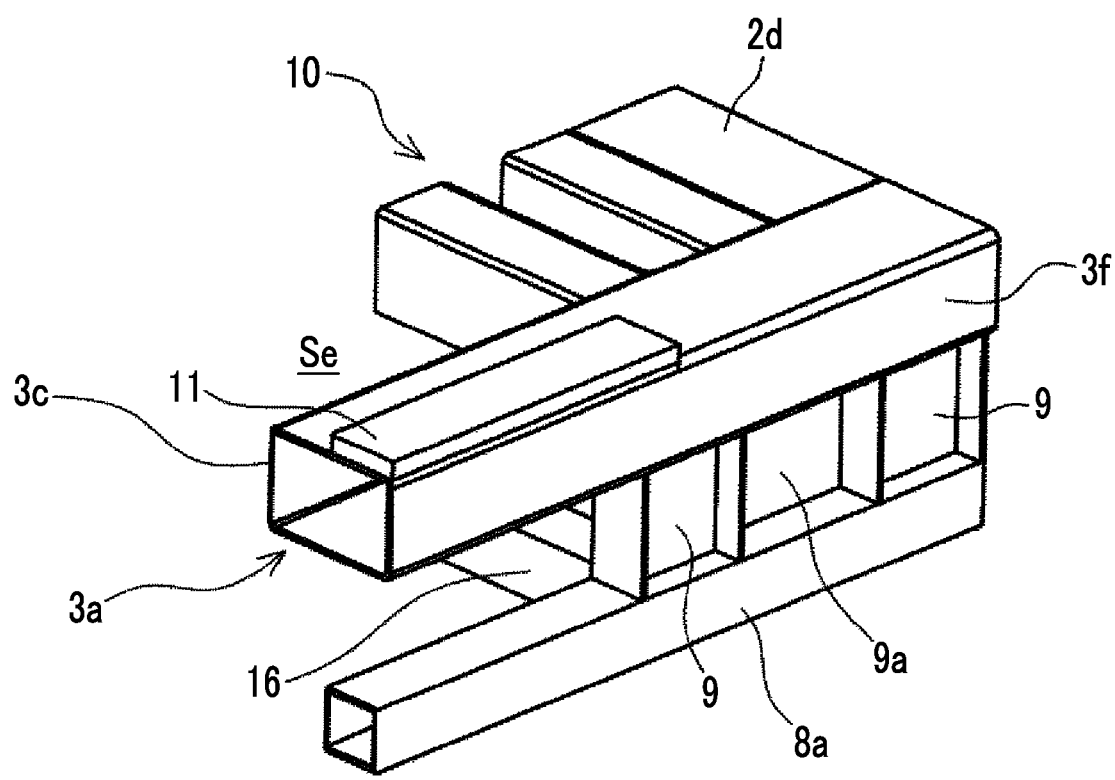
FIG. 8 is a perspective view illustrating the main part of the base frame of FIGS. 4A and 4B with the platen attachment plate removed.
Figure 9A:
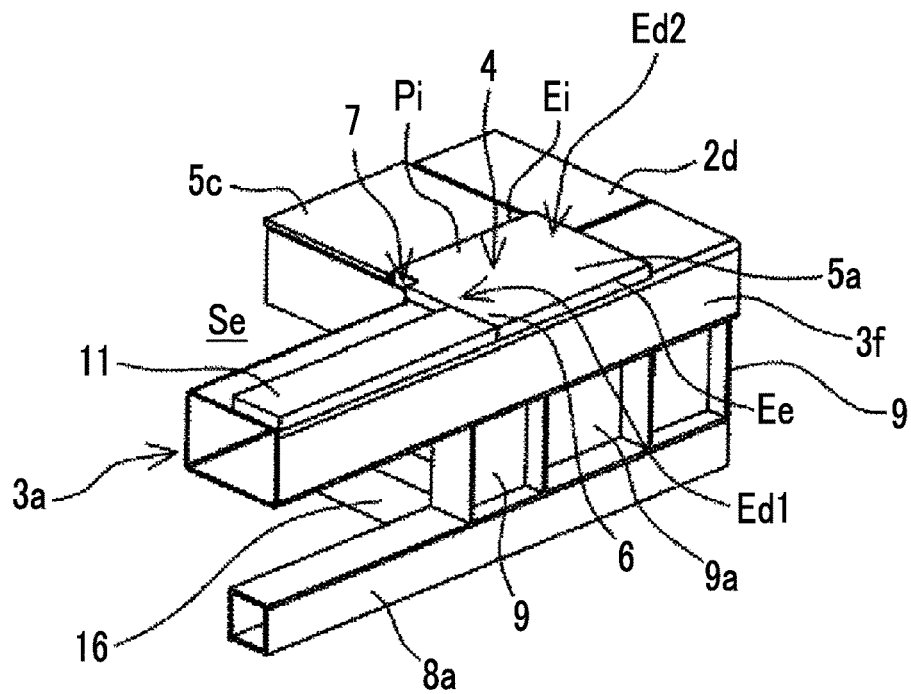
FIGS. 9A and 9B are perspective views from a different direction illustrating a main part taken out with a part of the base frame of FIG. 2 cut out.
Figure 9B:
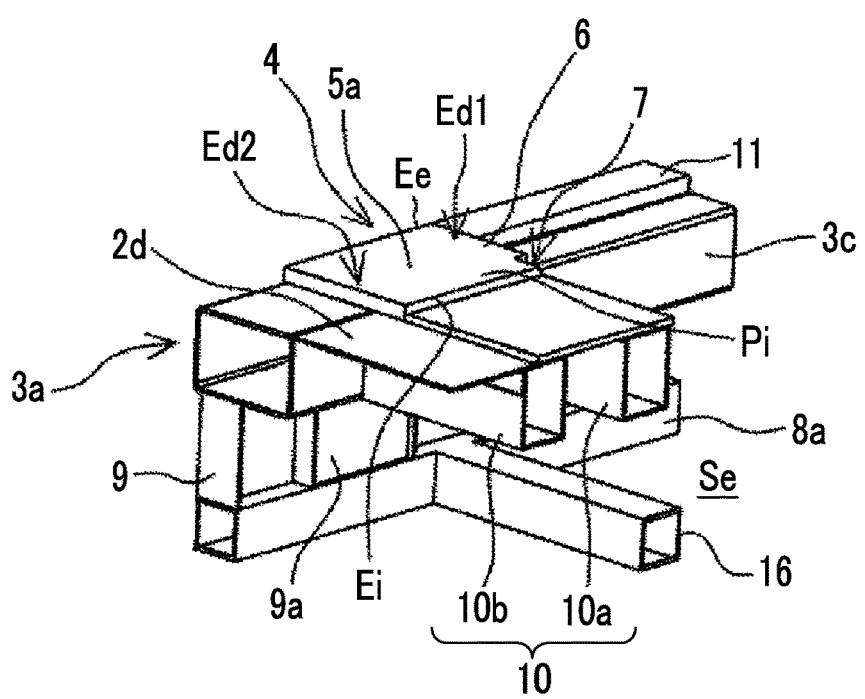

In this mold clamping unit side frame 2*a*, as illustrated in FIG. 8 with the platen attachment plate 4 removed, a connecting beam 10 extending between the pair of main beams 3*a* and 3*b* in the width direction and interconnecting the main beams 3*a* and 3*b* is provided at the position directly below the platen attachment plate 4 as described above. Although a part of the inside part Pi of the platen attachment plate 4 is also disposed on the connecting beam 10, the center plate member 5*c* is mainly disposed, and the connecting beam 10 and the center plate member 5*c* are welded. The arrangement of the connecting beam 10 is preferable in that the main beams 3*a* and 3*b* can be reinforced in the width direction against, for example, the external force that is transmitted from the stationary platen 32*a* to the platen attachment plate 4 and to the main beams 3*a* and 3*b*. Here, the connecting beam 10 is configured by two square pipes spaced apart from each other in the longitudinal direction, and end surfaces of the square pipes are joined by welding to the inside surfaces 3*c* of the main beams 3*a* and 3*b*. The connecting beam 10 can be one square pipe or three or more square pipes and may be configured by a non-square pipe member.

From the viewpoint of welding crack prevention, it is preferable that the protruding edge portion 6 of the platen attachment plate 4 described above is positioned closer to the movable platen 32*b* side in the longitudinal direction than the side surface on the movable platen 32*b* side of the connecting beam 10 directly therebelow. Meanwhile, it is preferable that the outer edge portion Ed1 on the movable platen 32*b* side at the inside part Pi of the platen attachment plate 4 is positioned on the same plane as the side surface of the connecting beam 10 on the movable platen 32*b* side in the longitudinal direction. This is to sufficiently ensure the molding product take-out space Se.

Although each of the main beams 3*a* and 3*b* can also be configured by two or more beam members mutually joined by welding, in the illustrated example, each of the main beams 3*a* and 3*b* has a beam member such as a single square pipe joined to each other by welding.

On the beam member configuring each of the main beams 3*a* and 3*b*, a long guide plate 11 longitudinally extending in parallel to the beam member is disposed so as to be biased to the outside in the width direction. A guide member 32*d*, where the movable platen 32*b* is disposed, is laid on the guide plate 11 and guides the displacement of the movable platen 32*b* away from and toward the stationary platen 32*a*.

The guide plate 11 is longitudinally positioned adjacent to the platen attachment plate 4. Further, the end portion of the guide plate 11 on the injection unit 21 side is positioned in contact with the outer edge portion Ed1 of the platen attachment plate 4 on the movable platen 32*b* side, more specifically, with the protruding edge portion 6 described above. In the illustrated example, the guide plate 11 is approximately equal in thickness to the platen attachment plate 4, and the surfaces thereof facing the mold clamping unit 31 side are substantially in the same plane.

The molding product take-out space Se described above is provided between the main beams 3*a* and 3*b* on the movable platen 32*b* side beyond the platen attachment plate 4.

The frame base portions 8*a* and 8*b* can be configured by, for example, square pipes.

The frame base portions 8*a* and 8*b* are interconnected by connection members 16 extending in the width direction, and one of the connection members 16 is positioned on the frame installation surface Si side of the platen attachment plate 4 described above.

It should be noted that the injection unit side frame 2*b* includes injection side beams 17*a* and 17*b* such as square pipes longitudinally extending side by side at an interval in the width direction of the base frame 2, injection side frame base portions 18*a* and 18*b* such as square pipes positioned directly below and extending in parallel to the injection side beams 17*a* and 17*b*, respectively, and a plurality of injection side connection members 20 provided at intervals in the longitudinal direction between the injection side frame base portions 18*a* and 18*b*. A long plate 17*c* is disposed over the entire longitudinal direction of the injection side beams 17*a* and 17*b*.

The injection unit side frame 2*b* and the mold clamping unit side frame 2*a* are interconnected in a state where a connecting plate 2*c* having a shape following the side portion of the mold clamping unit side frame 2*a* is interposed therebetween. The connecting plate 2*c* is formed in a shape protruding above a flat plate member 2*d* provided between the main beams 3*a* and 3*b* in the end portion of the mold clamping unit side frame 2*a* that is on the injection unit side frame 2*b* side in the longitudinal direction.

Another Base Frame

The base frame 2 of the illustrated embodiment is a structure that combines members including a plurality of beams and struts as illustrated in the partially enlarged view of FIG. 2. The illustrated base frame 2 includes a mold clamping unit side frame 2*a* where the mold clamping unit 31 is placed. As illustrated in FIG. 3, the stationary platen 32*a* is attached onto the mold clamping unit side frame 2*a*. It should be noted that the base frame 2 further includes an injection unit side frame 2*b* where the injection unit 21 is placed, the injection unit side frame 2*b* is connected to an end portion of the mold clamping unit side frame 2*a*, and the injection unit side frame 2*b* will be described in detail later. It should be noted that although not illustrated, there is also a base frame where a mold clamping side frame and an injection unit side frame are integrated, and not only a mold clamping unit but also an injection unit and the like are placed on such a base frame.

The mold clamping unit side frame 2a mainly includes a pair of main beams 3a and 3b spaced apart from each other in a width direction of the base frame 2 (direction perpendicular to the direction in which the stationary platen 32a and the movable platen 32b of the mold clamping unit 31 separate and approach in a horizontal plane) and extending side by side in a longitudinal direction of the base frame 2 (direction in which the stationary platen 32a and the movable platen 32b of the mold clamping unit 31 separate and approach), and a platen attachment plate 4 disposed on the main beams 3a and 3b near the end portion on the injection unit side frame 2b side. In the present embodiment, the platen attachment plate 4 is divided in the width direction of the base frame 2 and is configured to include two side plate members 5a and 5b disposed on the main beams 3a and 3b, respectively. It should be noted that as illustrated in FIG. 2, a center plate member 5c thinner than, for example, the side plate members 5a and 5b is disposed between the two side plate members 5a and 5b in the width direction, and width-direction outer ends of the center plate member 5c are welded to width-direction inner ends Ei of the side plate members 5a and 5b.

The stationary platen 32a is attached to the platen attachment plate 4 as illustrated in FIG. 3. More specifically, in the illustrated example, the stationary platen 32a as a whole has a substantially square or rectangular plate shape with the four corners substantially rounded in a front view, and a bottom surface of the lower end portion of the stationary platen 32a is provided with a pair of leg portions 32e having, for example, a block shape, spaced apart in the width direction of the base frame 2, protruding from the bottom surface, and having steps on the outside in the width direction. Each of the four corners of the plate-shaped stationary platen 32a is formed with a through-hole 32f through which the tie bar 32c is passed and a recessed portion 32g where the surface part around the through-hole 32f is recessed in relation to the other part. Meanwhile, as for the side plate members 5a and 5b of the platen attachment plate 4, platen fixing parts used for fixing to the leg portions 32e are provided at positions corresponding to the arrangement positions of the leg portions 32e. Although not illustrated, the platen fixing part can be, for example, a hole portion where a bolt used for fastening to the leg portion 32e of the stationary platen 32a is inserted. However, the method of attaching the stationary platen 32a is not limited thereto. It should be noted that although not illustrated in FIG. 3, the movable platen 32b is positioned on the side opposite to the injection unit side frame 2b across the stationary platen 32a in the longitudinal direction of the base frame 2 and is spaced apart from the stationary platen 32a, and this interval changes in accordance with the operation of the platen operation mechanism 33.

The platen attachment plate 4 is welded at welding points and is joined to the main beams 3a and 3b. The welding points between the platen attachment plate 4 and the main beams 3a and 3b include at least one of the outer edge portions Ed1 and Ed2 of the platen attachment plate 4, which are in the longitudinal direction of the base frame 2 as illustrated in FIGS. 2, 9A and 9B, and 10A to 10C. Although the welding part of the outer edge portion Ed1 and/or Ed2 can be changed as appropriate, in this example, in the outer edge portion Ed1 of the platen attachment plate 4 on the movable platen 32b side, the width-direction insides thereof are partially welded to the main beams 3a and 3b and, in the outer edge portion Ed2 of the platen attachment plate 4 on the injection unit 21 side, the entire part of contact with the main beams 3a and 3b is welded. In addition, in the present embodiment, the side plate members 5a and 5b of the platen attachment plate 4 are wholly joined by welding to the main beams 3a and 3b not only in the outer edge portions Ed1 and Ed2 but also at outer ends Ee positioned outside in the width direction of the base frame 2, and thus the outer end Ee is also a welding point. The outer edge portions Ed1 and Ed2 and the outer ends Ee of the platen attachment plate 4 can be regarded as welding points insofar as the outer edge portions Ed1 and Ed2 and the outer ends Ee of the platen attachment plate 4 are at least in part welded to the main beams 3a and 3b.

In a case where a platen attachment plate has a welding point as described above, various external forces from a stationary platen may act to result in a welding crack at the welding point. More specifically, in the stationary platen that has a lower end portion fixed to a base frame with tie bars attached at the four corners therearound, when, for example, a mold unit is put into a mold clamping state, with the lower end portion and the four corners restrained, deformation may occur such that the middle portion against which the mold unit is pressed falls toward a movable platen while bulging toward an injection unit. With such deformation, the leg portions in the lower end portion of the stationary platen may be deformed toward the inside in the width direction. At this time, an external force directed inward in the width direction acts on a pair of main beams via the platen attachment plate, where the main beams are welded and the stationary platen leg portions are attached. Such an external force may cause the welding crack at, for example, the welding point between the main beam and the platen attachment plate. This becomes conspicuous in a case where high-cycle molding is performed to repeatedly manufacture a molding product in a relatively short cycle.

However, in the present embodiment, the connecting beam 10 extending between the pair of main beams 3a and 3b in the width direction and interconnecting the main beams 3a and 3b is provided on the frame installation surface Si side of the platen attachment plate 4. According to this, the connecting beam 10 provided between the main beams 3a and 3b stretches against the external force that acts on the main beams 3a and 3b via the platen attachment plate 4 from the leg portion 32e of the stationary platen 32a, and thus the stress that is applied to, for example, the welding point of the platen attachment plate 4 due to the action of the external force can be mitigated, and a welding crack can be effectively suppressed. As a result, the durability of the base frame 2 can be improved.

Figure 11:
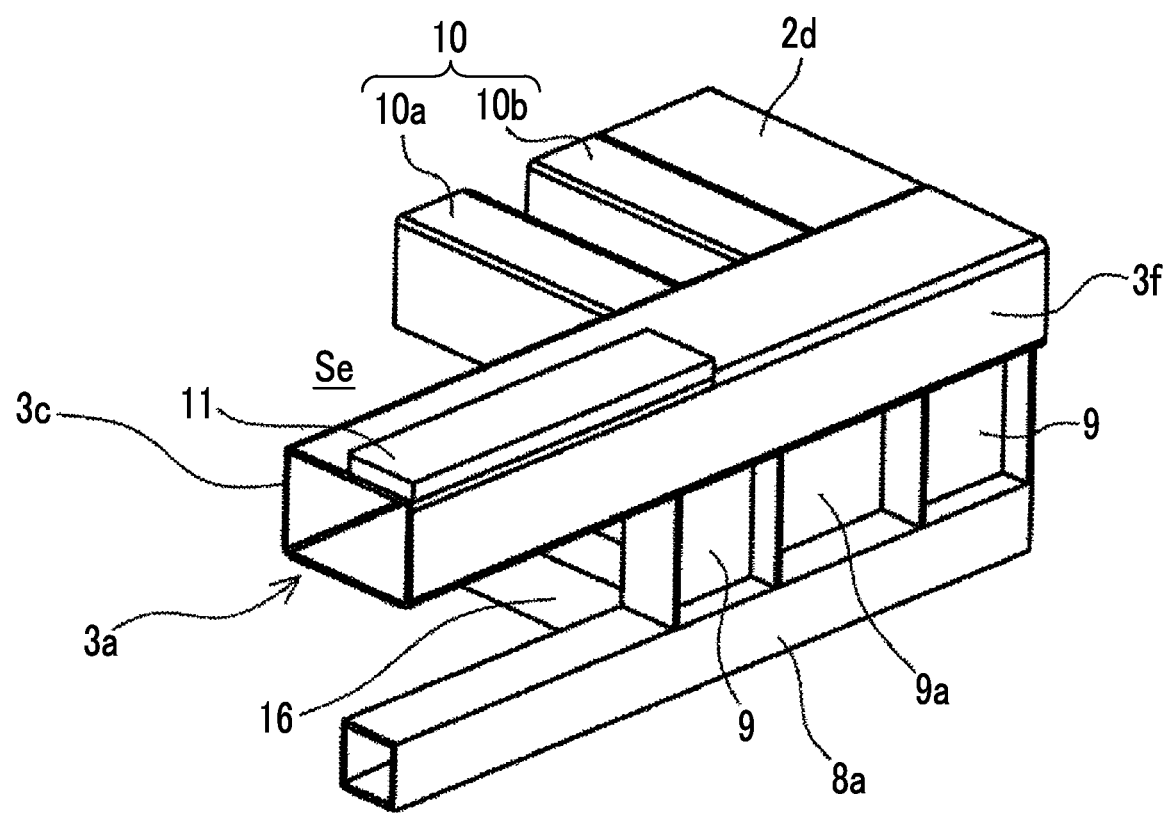
FIG. 11 is a perspective view illustrating the main part of the base frame of FIGS. 9A and 9B with the platen attachment plate removed.

Specifically, the connecting beam 10 can be configured by one or more connecting beam members 10a and 10b. In particular, the connecting beam 10 being configured to include a plurality of connecting beam members 10a and 10b, such as two, as illustrated in FIG. 11 with the platen attachment plate 4 removed is preferable in that an external force directed inward in the width direction to the main beams 3a and 3b can be more effectively counteracted. Each of the connecting beam members 10a and 10b can be configured by members having various shapes. For the connecting beam members 10a and 10b exemplified in this specification, tubular square pipes having square or rectangular inner and outer contour shapes in a cross section perpendicular to an axial direction are used, and a required resistance in the axial direction can be sufficiently exhibited as a result. Here, each of the connecting beam members 10a and 10b is disposed such that each of the four surfaces around the square pipe with a rectangular cross section is in the direction parallel to the longitudinal direction or to the height direction (vertical direction perpendicular to the longitudinal and width directions). However, the connecting beam members 10a and 10b may be configured by non-square pipe members. It should be noted that the connecting beam 10, the connecting beam members 10a and 10b to be specific, have end portions that can be joined by welding to the inside surfaces 3c of the main beams 3a and 3b.

The two connecting beam members 10a and 10b configuring the connecting beam 10 can be spaced apart from each other in the longitudinal direction as illustrated in FIGS. 9A to 11. It should be noted that although not illustrated, when three or more connecting beam members are provided, at least one pair of the connecting beam members adjacent to each other in the longitudinal direction among the connecting beam members can be disposed so as to be separated from each other in the longitudinal direction.

Figure 12A:
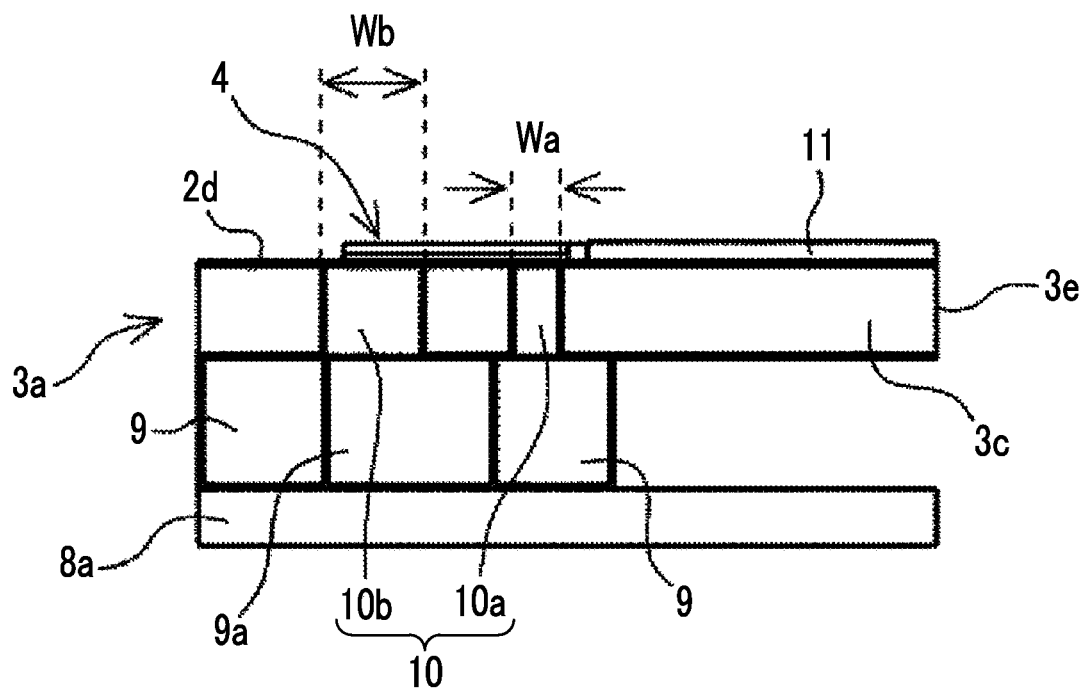
FIGS. 12A and 12B are rear views of the main part of the base frame illustrating a modification example or another disposition example of a connecting beam of the base frame.

Here, the connecting beam members 10a and 10b spaced apart from and adjacent to each other in the longitudinal direction are capable of having longitudinal dimensions (that is, beam widths) equal to each other. However, in a case where the adjacent connecting beam members 10a and 10b are spaced apart from each other in this manner, it is preferable that the adjacent connecting beam members 10a and 10b have different longitudinal dimensions as illustrated in FIG. 12A. More specifically, as for the connecting beam members 10a and 10b, although a longitudinal dimension Wa of one connecting beam member 10a positioned on the movable platen 32b side may be made larger than a longitudinal dimension Wb of the other connecting beam member 10b positioned on the injection unit 21 side, it is more preferable that the longitudinal dimension Wa of the connecting beam member 10a on the movable platen 32b side is smaller than the longitudinal dimension Wb of the connecting beam member 10b on the injection unit 21 side. The connecting beam member 10a on the movable platen 32b side is often positioned closer to the movable platen 32b side than the platen fixing part of the platen attachment plate 4 in the longitudinal direction and, by relatively reducing the longitudinal dimension Wa of the connecting beam member 10a, the connecting beam member 10a with a small beam width is capable of exhibiting a large endurance with respect to bending attributable to a vertically downward external force in the direction in which the stationary platen 32a falls. Meanwhile, in the connecting beam member 10b on the injection unit 21 side, where the longitudinal dimension Wb is relatively large, the load attributable to the weight received from the stationary platen 32a can be effectively supported.

Figure 12B:
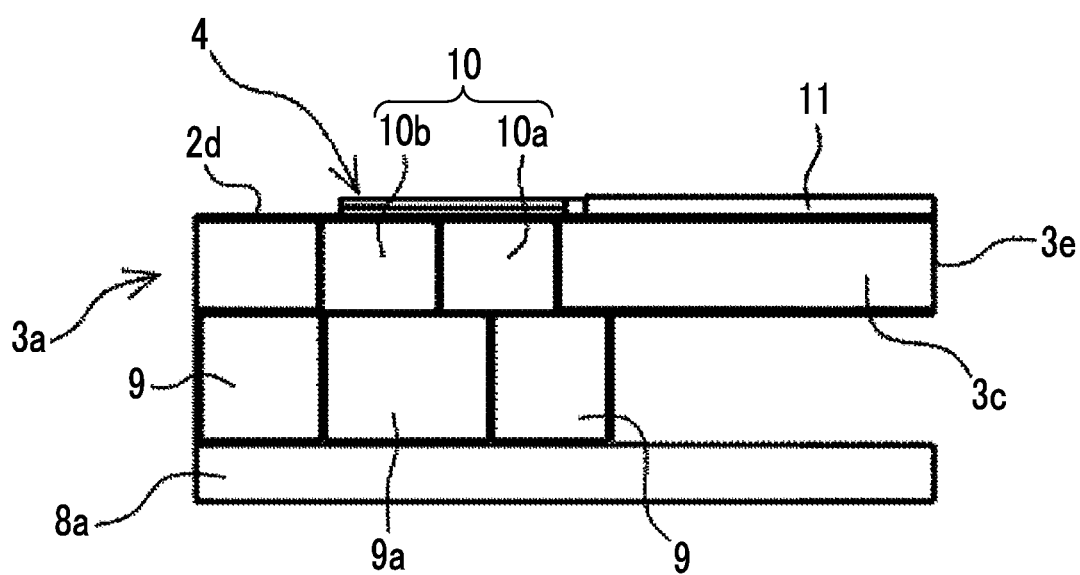

Alternatively, the two connecting beam members 10a and 10b configuring the connecting beam 10 can be disposed in contact with each other in the longitudinal direction as illustrated in FIG. 12B. In this case, the adjacent connecting beam members 10a and 10b are brought into contact with each other on side surfaces thereof and, for example, adjacent corner portions thereof or the like can be joined by, for example, performing welding continuously or intermittently in the width direction at least in part in the width direction. Although not illustrated, as for a connecting beam including three or more connecting beam members, at least a pair of the connecting beam members adjacent to each other in the longitudinal direction among the connecting beam members can be disposed in contact with each other in the longitudinal direction.

When the connecting beam members 10a and 10b are disposed in contact with each other in the longitudinal direction, it is preferable that the adjacent connecting beam members 10a and 10b have equal height-direction dimensions (that is, beam depths). When connecting beam members with different beam depths are disposed in contact with each other, a corner portion of the low-beam depth connecting beam member abuts against a side surface of the high-beam depth connecting beam member, and stress concentration there may deform the high-beam depth connecting beam member. As for the equal dimensions mentioned here, the two dimensions do not necessarily have to strictly match, and a difference to the extent of a potential tolerance in manufacturing a connecting beam member such as a square pipe is allowed. The connecting beam members can be regarded as having equal dimensions in, for example, the height direction insofar as the members have a dimensional difference that one procurable from the market is capable of having equal dimensions in, for example, the height direction.

It should be noted that the height-direction dimensions of the connecting beam members 10a and 10b can be, for example, approximately equal to the height-direction dimensions of the main beams 3a and 3b. In this case, the front and back surfaces of the connecting beam members 10a and 10b and the front and back surfaces of the main beams 3a and 3b are positioned so as to be aligned substantially coplanarly, respectively.

The mold clamping unit side frame 2a illustrated in the drawings further includes the pair of longitudinally extending frame base portions 8a and 8b disposed apart from the main beams 3a and 3b on the frame installation surface Si side of the pair of main beams 3a and 3b (lower side in the vertical direction), and the plurality of struts 9 provided so as to be interposed between the main beams 3a and 3b and the frame base portions 8a and 8b and extending in the height direction (vertical direction). It should be noted that although the frame base portions 8a and 8b are square pipes and the struts 9 are H-shaped steel in the illustrated example, the specific structures of the frame base portions 8a and 8b and the struts 9 can be changed as appropriate. The main beams 3a and 3b, the struts 9, and the frame base portions 8a and 8b can be mutually joined by welding.

It is preferable that the struts 9 are also disposed between the main beams 3a and 3b and the frame base portions 8a and 8b on the frame installation surface Si side of the platen attachment plate 4 and of the connecting beam 10. In this case, the load that the platen attachment plate 4 receives from the stationary platen 32a is effectively supported by the struts 9.

Figure 10A:
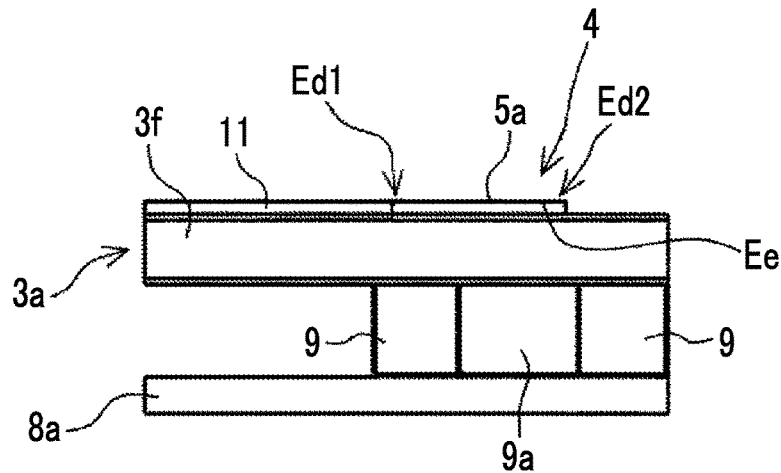
FIGS. 10A to 10C are front, rear, and plan views of the main part of the base frame illustrated in FIGS. 9A and 9B.
Figure 10B:
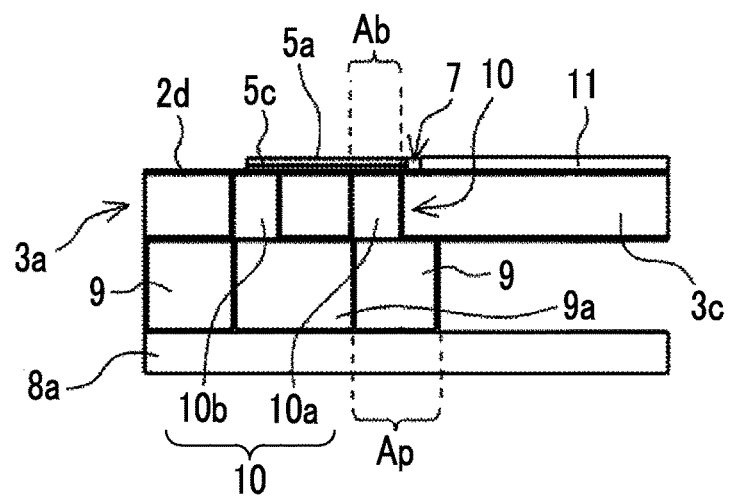
Figure 10C:
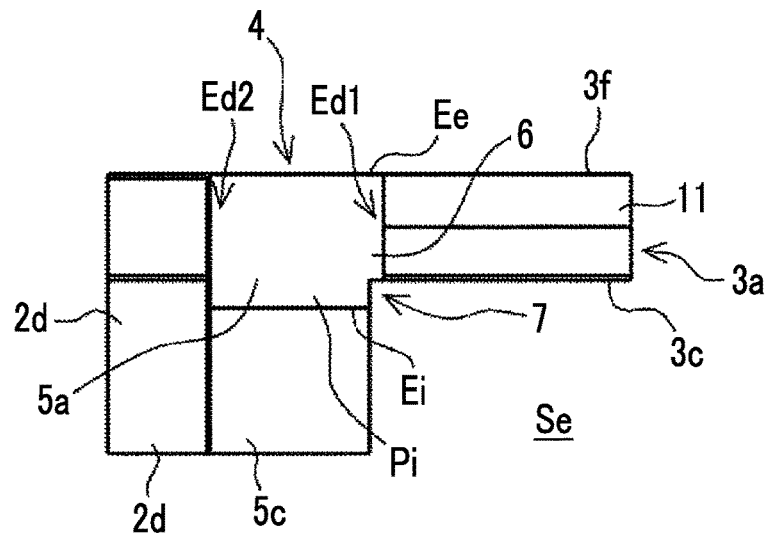

In this case in particular, it is preferable that the connecting beam 10 and the struts 9 are disposed such that a disposition region Ab of at least one connecting beam member 10a out of the connecting beam members 10a and 10b configuring the connecting beam 10 and the disposition region Ap of the strut 9 positioned on the frame installation surface Si side of the connecting beam 10 overlap in the longitudinal direction as illustrated in FIG. 10B. Here, the disposition region Ab of at least one connecting beam member 10a out of the two connecting beam members 10a and 10b and the disposition region Ap of at least one of the two struts 9 may overlap. If and when the disposition region Ab of the connecting beam member 10a on the movable platen 32b side overlaps the disposition region Ap of the strut 9 on the frame installation surface Si side as in the example illustrated in FIG. 10B, the strut 9 effectively supports the main beams 3a and 3b and the connecting beam 10 against an external force in the direction in which the stationary platen 32a falls. In addition, although not illustrated in the drawings, when the disposition region of the connecting beam member on the injection unit side overlaps the disposition region of the strut on the frame installation surface side, the strut is capable of effectively supporting the load attributable to the weight received from the stationary platen.

In the illustrated example, the platen attachment plate 4 disposed on the connecting beam 10 has a shape in which the length in the longitudinal direction is longer at the outer ends Ee than at the width-direction inside parts Pi of the base frame 2. More specifically, the outside part of the platen attachment plate 4 that includes the width-direction outer end Ee is formed with the protruding edge portion 6 protruding longitudinally outward beyond the inside part Pi. As a result, at the position adjacent to the outer edge portion Ed1 on the movable platen 32b side at the inside part Pi of the platen attachment plate 4, an empty space 7 recessed in, for example, a rectangular shape in a plan view is formed inside the protruding edge portion 6 in the longitudinal direction. The empty space 7 configures a part of the molding product take-out space Se, which is the lower space between the stationary platen 32a and the movable platen 32b. As for this platen attachment plate 4, the side surface of the outer edge portion Ed1 that faces the empty space 7 is L-shaped in a plan view. The width-direction length of the protruding edge portion 6 can be equal to or shorter than the width of the main beam 3a.

The inner ends Ei of the side plate members 5a and 5b can be positioned so as to protrude inside, in the width direction, the width-direction inside surfaces 3c of the main beams 3a and 3b where the side plate members 5a and 5b are disposed, respectively. Meanwhile, the outer ends Ee of the side plate members 5a and 5b can be substantially aligned with the width-direction outside surfaces 3f of the main beams 3a and 3b and be substantially coplanar with the outside surfaces 3f in a plan view. In this example, both the inner ends Ei and the outer ends Ee of the side plate members 5a and 5b linearly extend in the longitudinal direction.

Figure 13:
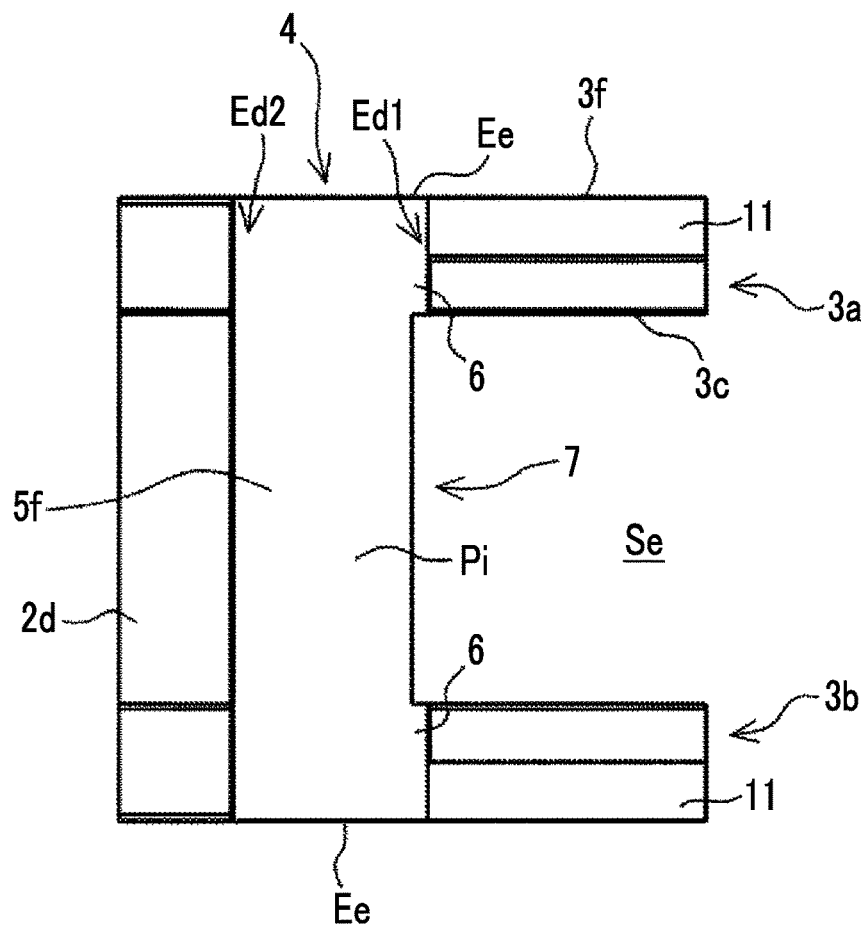
FIG. 13 is a plan view of the main part of the base frame illustrating a modification example of the platen attachment plate of the base frame.

As illustrated in FIG. 13, the platen attachment plate 4 disposed on the connecting beam 10 can also be configured to include the single and integrated erection plate member 5f bridging between the pair of main beams 3a and 3b instead of the two divided side plate members 5a and 5b described above. In FIG. 13, the erection plate member 5f extends over the entire width direction between the outside surfaces 3f of the main beams 3a and 3b in a plan view.

Regardless of whether the platen attachment plate 4 is configured by the divided side plate members 5a and 5b or by the integrated erection plate member 5f, the connecting beam 10 can be joined by welding, at least in part, to the plate members disposed thereon, that is, the side plate members 5a and 5b and the center plate member 5c or the erection plate member 5f therebetween.

Figure 14:
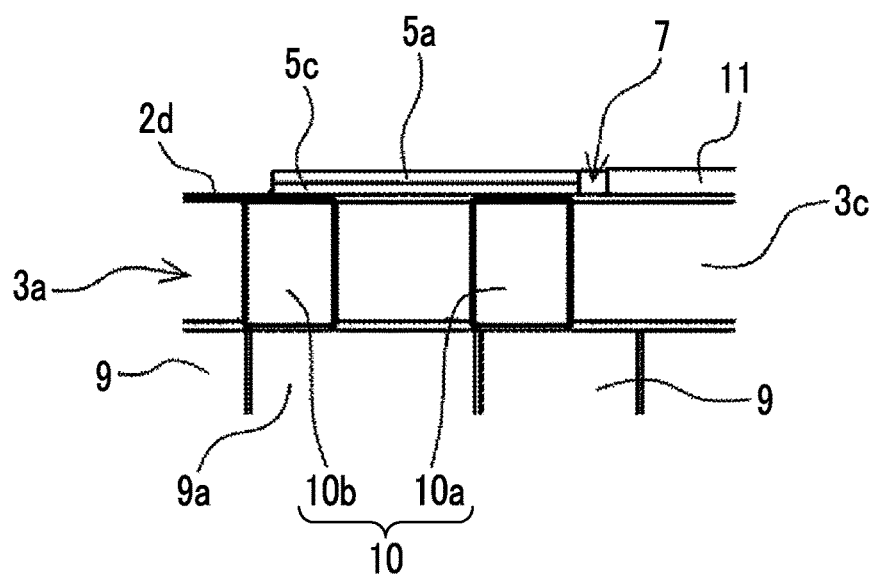
FIG. 14 is a partially enlarged rear view of the main part of the base frame illustrated in FIGS. 9A and 9B.

In addition, as illustrated in FIG. 14, the side plate members 5a and 5b and the center plate member 5c of the platen attachment plate 4 can be, for example, disposed so as to be slightly shifted to the movable platen 32b side with respect to the part between the longitudinally outward side surfaces of the connecting beam 10. Here, the side plate members 5a and 5b and the center plate member 5c are disposed such that the outer edge portions of the side plate members 5a and 5b and the center plate member 5c on the movable platen 32b side slightly protrude to the movable platen 32b side beyond the side surface of the connecting beam 10 on the movable platen 32b side and the outer edge portions of the side plate members 5a and 5b and the center plate member 5c on the injection unit 21 side are slightly recessed inward in the longitudinal direction beyond the side surface of the connecting beam 10 on the injection unit 21 side. In this case, welding is facilitated between the side plate members 5a and 5b and the center plate member 5c and the connecting beam 10 and between the connecting beam 10 and the flat plate member 2d disposed between the connecting beam 10 and the injection unit side frame 2b in the longitudinal direction. The welding points thereof may be intermittent or continuous in the width direction. Likewise, in a case where the platen attachment plate 4 is configured by the erection plate member 5f, the erection plate member 5f can be displaced in the longitudinal direction with respect to the part between the longitudinally outward side surfaces of the connecting beam 10.

Although each of the main beams 3a and 3b can also be configured by two or more main beam members mutually joined by welding, in the illustrated example, each of the main beams 3a and 3b has a main beam member 3e such as a single square pipe joined to the other by welding.

On the main beam member 3e configuring each of the main beams 3a and 3b, the long guide plate 11 longitudinally extending in parallel to the main beam member 3e is disposed so as to be biased to the outside in the width direction. A guide member 32d, where the movable platen 32b is disposed, is laid on the guide plate 11 and guides the displacement of the movable platen 32b away from and toward the stationary platen 32a.

The guide plate 11 is longitudinally positioned adjacent to the platen attachment plate 4. Further, the end portion of the guide plate 11 on the injection unit 21 side is positioned in contact with the outer edge portion Ed1 of the platen attachment plate 4 on the movable platen 32b side, more specifically, with the protruding edge portion 6 described above. In the illustrated example, the guide plate 11 is approximately equal in thickness to the platen attachment plate 4, and the surfaces thereof facing the mold clamping unit 31 side are substantially in the same plane.

The molding product take-out space Se described above is provided between the main beams 3a and 3b on the movable platen 32b side beyond the platen attachment plate 4 in the longitudinal direction.

The frame base portions 8a and 8b can be configured by, for example, square pipes. In addition, the frame base portions 8a and 8b are interconnected by the connection members 16 extending in the width direction, and at least one of the connection members 16 is positioned on the frame installation surface Si side of the platen attachment plate 4 described above.

It should be noted that the injection unit side frame 2b includes injection side beams 17a and 17b such as square pipes longitudinally extending side by side at an interval in the width direction of the base frame 2, injection side frame base portions 18a and 18b such as square pipes positioned directly below and extending in parallel to the injection side beams 17a and 17b, respectively, and a plurality of injection side connection members 20 provided at intervals in the longitudinal direction between the injection side frame base portions 18a and 18b. A long plate 17c is disposed over the entire longitudinal direction of the injection side beams 17a and 17b.

The injection unit side frame 2b and the mold clamping unit side frame 2a are interconnected in a state where a connecting plate 2c having a shape following the side portion of the mold clamping unit side frame 2a is interposed therebetween. The connecting plate 2c is formed in a shape protruding above a flat plate member 2*d* provided between the main beams 3*a* and 3*b* in the end portion of the mold clamping unit side frame 2*a* that is on the injection unit side frame 2*b* side in the longitudinal direction.

Injection Unit

The injection unit 21 mainly includes a cylindrical cylinder 22 extending toward the mold unit 101, the screw 23 disposed in the cylinder 22 with a central axis parallel thereto and provided with a helical flight therearound, the heater 24 having, for example, a band shape and disposed on an outer peripheral side of the cylinder 22 so as to surround the circumference thereof, and a motor box 25 disposed on the rear side of the cylinder 22 and of the screw 23. Although not illustrated, a plasticizing motor rotating the screw 23 around its central axis so that a predetermined amount of molding material is stored at a tip part of the cylinder 22, an injection motor displacing the screw 23 forward and backward in the directions toward and away from the mold unit 101, respectively, a pressure detection sensor detecting the pressure that the screw 23 receives from the molding material, and the like are disposed in the motor box 25.

It should be noted that here, the direction toward the stationary platen 32*a* of the mold clamping unit 31 to which the stationary mold 102 of the mold unit 101 is attached is the front side, and the direction away from the stationary platen 32*a* is the rear side. Accordingly, in FIG. 1, when the injection unit 21 positioned on the right side of the stationary platen 32*a* is viewed, the leftward direction toward the stationary platen 32*a* is the front side, and the rightward direction away from the stationary platen 32*a* is the rear side.

The cylinder 22 is provided with a feed port 22*a* in front of the motor box 25 on the rear side, and a hopper for charging a molding material into the cylinder 22 can be attached to the feed port 22*a*. In addition, a nozzle 22*b* with a smaller cross-sectional area on the front side thereof is provided at a tip part of the cylinder 22 close to the mold unit 101. It should be noted that a water cooling cylinder 22*c* based on, for example, water cooling can be provided in the vicinity of the feed port 22*a*.

The heater 24 disposed around the cylinder 22 including the periphery of the nozzle 22*b* can be, for example, divided into a plurality of parts in the axial direction of the cylinder as illustrated in the drawing and may be capable of heating the inner portions of the cylinder 22 inside the heater parts to different temperatures. Each heater part can be provided with a temperature measurer.

On a tip side of the screw 23, a backflow prevention ring (not illustrated) can be disposed around a constricted portion provided by partially reducing the outer diameter thereof, and the backflow prevention ring is displaced forward and backward together with the screw 23 to prevent a rearward backflow of the molding material sent forward therefrom. For example, the backflow prevention ring is displaced forward and backward with respect to the screw 23 in accordance with the pressure received from the molding material positioned forward or backward therefrom and, as a result, the molding material is allowed to flow only from the rear side to the front side.

According to the injection unit 21 having such a configuration, in a plasticizing process, the molding material charged into the cylinder 22 from the feed port 22*a* is heated by the heater 24 on the outer peripheral side of the cylinder 22 to be melted based on the rotation of the screw 23 driven by the plasticizing motor and, at the same time, is fed forward in the cylinder 22 to be stored at the tip part of the cylinder 22. At this time, the screw 23 is displaced backward by the injection motor to form a molding material storage space at the tip part of the cylinder 22. It should be noted that as described above, the plasticizing process can be performed in, for example, the cooling process in the previous molding.

After that, in a filling process, by displacing the screw 23 forward, the molding material at the tip part of the cylinder 22 is injected toward the mold unit 101 through the nozzle 22*b*. Further, in the subsequent holding pressure process, pressure is applied to the molding material with which the cavity of the mold unit 101 is filled through the molding material remaining at the tip part of the cylinder 22. At this time, it is possible to replenish the molding material that is insufficient due to cooling shrinkage of the molding material in the cavity of the mold unit 101.

It should be noted that although this injection molding machine 1 is an in-line screw-type machine, it can also be a pre-plasticization-type injection molding machine in which a plasticizing cylinder and a plasticizing screw are structurally and functionally separated from an injection cylinder and an injection plunger.

Moving Unit

The moving unit 26 is, for example, provided below the motor box 25 of the injection unit 21, and is a forward/rearward drive mechanism displacing the injection unit 21 forward and backward with respect to the stationary platen 32*a*.

Although various mechanisms can be adopted as the forward/rearward drive mechanism configuring the moving unit 26, the moving unit 26 illustrated in the drawing is configured to include a hydraulic pump 27 using hydraulic pressure or the like, a pump operation motor 28 such as an electric motor operating the hydraulic pump 27, and a double-acting hydraulic cylinder 29 supplied with a hydraulic fluid from the hydraulic pump 27 and extracting and retracting a piston rod with a tip fixed to the stationary platen 32*a*.

The moving unit 26 further includes a slide base 26*a* where the hydraulic pump 27, the pump operation motor 28, and the hydraulic cylinder 29 are attached and a guide 26*b* laid on the base frame 2 to guide the linear motion of the slide base 26*a*. As a result, the injection unit 21 placed on the slide base 26*a* is displaced forward and backward.

The moving unit 26 separates the injection unit 21 from the mold unit 101 or brings the injection unit 21 close to the mold unit 101, and thus it is possible to perform so-called nozzle touch, in which the nozzle 22*b* of the cylinder 22 of the injection unit 21 is pressed against the mold unit 101 with a predetermined pressure.

Mold Clamping Unit

The mold clamping unit 31 opens and closes the mold unit 101 by displacing the movable mold 103 with respect to the stationary mold 102 of the mold unit 101 and puts the mold unit 101 into the mold clamping, closing, or opening state. This mold clamping unit 31 has the platen 32 including the stationary platen 32*a*, the movable platen 32*b*, and the tie bar 32*c* and the platen operation mechanism 33 operating the platen 32.

The stationary platen 32*a* of the platen 32 is fixedly attached to the platen attachment plate of the base frame 2 as described above. Meanwhile, the movable platen 32*b* is disposed on the guide member 32*d* laid on the guide plate of the base frame 2 and is capable of sliding away from and toward the stationary platen 32*a*.

The platen operation mechanism 33 includes the rear platen 34 disposed on the base frame 2, a mold clamping motor 35 provided on the rear platen 34, a motion conversion mechanism 36 converting rotary motion of the mold clamping motor 35 into displacement-direction linear motion of the movable platen 32b, and a toggle mechanism 37 increasing the force transmitted to the motion conversion mechanism 36 and transmitting the force to the movable platen 32b.

Of these components, although the motion conversion mechanism 36 can be various mechanisms capable of rotary-to-linear motion conversion, the motion conversion mechanism 36 in this example is configured to include a screw shaft 36a rotationally driven by the mold clamping motor 35 and a nut 36b screwed onto the screw shaft 36a. In addition, the motion conversion mechanism 36 can be a ball screw.

The toggle mechanism 37, which increases the force transmitted from the motion conversion mechanism 36, is formed by connecting a plurality of links 37a to 37c, which connect the rear platen 34 and the nut 36b to the movable platen 32b, with joints so as to be capable of oscillation.

Although the links and the joints can be changed in number and shape as appropriate, in FIG. 1, a pair of link groups including the links 37a to 37c positioned above and below across a crosshead 37d are provided, by being connected so as to be capable of oscillation, at the crosshead 37d connected to the nut 36b and extending in an up-down direction.

It should be noted that a mold space adjustment motor 38 as well as the mold clamping motor 35 described above can be provided on the rear platen 34. The mold space adjustment motor 38 functions to adjust the interval between the stationary platen 32a and the rear platen 34 movably placed on base frame 2 by applying a rotational driving force to the screw shaft and to the nut connected to the extending part of each tie bar 32c of the platen 32. As a result, even in the event of, for example, mold unit 101 replacement or a change in the thickness of the mold unit 101 attributable to a change in temperature, it is possible to perform mold space adjustment such that a desired mold clamping force can be applied to the mold unit 101. In addition, although not illustrated, the mold space adjustment can be performed with the stationary platen side movable on the base frame 2 and the rear platen side fixed.

Although the mold clamping unit 31 illustrated in the drawing is a horizontal unit in which the direction of movement of the movable platen 32b is parallel to the horizontal direction, the mold clamping unit 31 can also be a vertical unit in which the direction of movement is vertical.

Ejector Unit

The ejector unit 41 provided on the movable platen 32b has an ejector rod 42 extending through the movable platen 32b and driven forward and backward so as to press the movable member 104 such as the ejector pin of the mold unit 101 from the rear side and a rod drive source 43 including a motion conversion mechanism such as a motor and a ball screw to operate the ejector rod 42.

With the ejector unit 41 in a molding product take-out process, the ejector rod 42 driven by the rod drive source 43 can be moved forward, the movable member 104 is capable of protruding in the mold unit 101, and the molding product can be pushed out of the mold unit 101. It should be noted that after the protrusion of the movable member 104, the ejector rod 42 can be moved backward and returned to its original position by the rod drive source 43.

It should be understood that the invention is not limited to the above-described embodiment, but may be modified into various forms on the basis of the spirit of the invention. Additionally, the modifications are included in the scope of the invention.

What is claimed is:

1. A base frame used in an injection molding machine provided with a mold clamping unit including a platen, on which at least the mold clamping unit is placed and which supports the mold clamping unit, the base frame comprising:
   a pair of main beams spaced apart from each other in a width direction of the base frame and extending side by side in a longitudinal direction of the base frame; and
   a platen attachment plate which is disposed on the main beams and to which the platen is attached,
   wherein outer edge portions of the platen attachment plate in the longitudinal direction include welding points joined by welding to the main beams, and the platen attachment plate has a shape in which a length in the longitudinal direction is longer at an outer end than at an inside part in the width direction,
   the platen includes a pair of leg portions spaced apart from each other in the width direction, and
   the platen attachment plate includes a pair of platen fixing parts used for fixing to the pair of leg portions, respectively, the pair of platen fixing parts being located inside of an inside part in the longitudinal direction.

2. The base frame according to claim 1,
   wherein at least one of the outer edge portions of the platen attachment plate includes a protruding edge portion protruding outward in the longitudinal direction beyond the inside part at an outside part including the outer end in the width direction.

3. The base frame according to claim 2,
   wherein a stationary platen is attached to the platen attachment plate, and
   at least the outer edge portion positioned on a movable platen side in the longitudinal direction among the outer edge portions of the platen attachment plate includes the protruding edge portion.

4. The base frame according to claim 3,
   wherein the platen attachment plate includes an empty space recessed inward in the longitudinal direction beyond the protruding edge portion and configuring a part of a molding product take-out space at a position adjacent to the outer edge portion on the movable platen side at the inside part.

5. The base frame according to claim 4,
   wherein a length of the protruding edge portion in the width direction is equal to or shorter than a width of the main beam.

6. The base frame according to claim 2,
   wherein a length of the protruding edge portion in the longitudinal direction is constant over the entire width direction.

7. The base frame according to claim 2,
   wherein a length of the protruding edge portion in the longitudinal direction gradually decreases inward in the width direction.

8. The base frame according to claim 1, further comprising:
   a pair of frame base portions spaced apart from the pair of main beams on respective frame installation surface sides of the main beams and extending in the longitudinal direction; and
   a strut provided between the main beam and the frame base portion,
   wherein the outer end of the platen attachment plate has a length in the longitudinal direction overlapping a disposition region of the strut positioned on the frame installation surface side of the platen attachment plate.

9. The base frame according to claim 8,
wherein two of the struts are provided, and a plate material is disposed between the two struts to block a gap therebetween.

10. The base frame according to claim 1,
wherein the platen fixing part is a hole portion where a bolt is inserted.

11. The base frame according to claim 1, further comprising a connecting beam provided at a position directly below the platen attachment plate, and extending between the pair of main beams in the width direction to interconnect the main beams.

12. The base frame according to claim 1,
wherein each of the pair of main beams includes two beam members joined by welding to each other.

13. The base frame according to claim 1,
wherein a stationary platen is attached to the platen attachment plate, and
the base frame further comprises a pair of guide plates which are provided adjacent to a movable platen side of the platen attachment plate on the respective main beams and on which a guide member is laid to guide displacement of the movable platen away from and toward the stationary platen.

14. The base frame according to claim 13,
wherein the guide plate is equal in thickness to the platen attachment plate.

15. A base frame used in an injection molding machine provided with a mold clamping unit including a platen, on which at least the mold clamping unit is placed and which supports the mold clamping unit, the base frame comprising:
a pair of main beams spaced apart from each other in a width direction of the base frame and extending side by side in a longitudinal direction of the base frame; and
a platen attachment plate which is disposed on the main beams and to which the platen is attached,
wherein outer edge portions of the platen attachment plate in the longitudinal direction include welding points joined by welding to the main beams, and the platen attachment plate has a shape in which a length in the longitudinal direction is longer at an outer end than at an inside part in the width direction,
the platen attachment plate includes two side plate members spaced apart from each other in the width direction, and
the inside part of the platen attachment plate is an inner end of each of the side plate members in the width direction.

16. The base frame according to claim 15, further comprising a center plate member disposed between the two side plate members in the width direction,
wherein the inner end of each side plate member of the platen attachment plate is joined by welding to the center plate member.

17. The base frame according to claim 16,
wherein the center plate member is thinner in thickness than the side plate member.

18. The base frame according to claim 15,
wherein the inner end of each side plate member of the platen attachment plate is positioned so as to protrude inward in the width direction beyond an inside surface of the main beam in the width direction.

19. The base frame according to claim 1,
wherein the platen attachment plate includes an erection plate member bridging between the pair of main beams.

20. A base frame used in an injection molding machine provided with a mold clamping unit including a platen, on which at least the mold clamping unit is placed and which supports the mold clamping unit, the base frame comprising:
a pair of main beams spaced apart from each other in a width direction of the base frame and extending side by side in a longitudinal direction of the base frame;
a platen attachment plate which is disposed on the main beams by being joined by welding and to which the platen is attached; and
a connecting beam extending between the pair of main beams in the width direction to interconnect the main beams on a frame installation surface side of the platen attachment plate,
wherein the platen includes a pair of leg portions spaced apart from each other in the width direction, and
the platen attachment plate includes a pair of platen fixing parts used for fixing to the pair of leg portions, respectively, the pair of platen fixing parts being located inside of an inside part in the longitudinal direction.

21. The base frame according to claim 20,
wherein the connecting beam is configured to include two or more connecting beam members extending in the width direction.

22. The base frame according to claim 21,
wherein at least a pair of the connecting beam members adjacent to each other in the longitudinal direction among the two or more connecting beam members of the connecting beam are spaced apart from each other in the longitudinal direction.

23. The base frame according to claim 22,
wherein the connecting beam members spaced apart from and adjacent to each other in the longitudinal direction have different dimensions in the longitudinal direction.

24. The base frame according to claim 23,
wherein the platen includes a stationary platen and a movable platen, and the stationary platen is attached to the platen attachment plate, and
of the connecting beam members spaced apart from and adjacent to each other in the longitudinal direction, the connecting beam member positioned on a movable platen side is smaller in dimension in the longitudinal direction than the other connecting beam member.

25. The base frame according to claim 24,
wherein an outer edge portion on the movable platen side at an inside part of the platen attachment plate is positioned on the same plane as a side surface of the connecting beam on the movable platen side in the longitudinal direction.

26. The base frame according to claim 21,
wherein at least a pair of the connecting beam members adjacent to each other in the longitudinal direction among the two or more connecting beam members of the connecting beam are disposed in contact with each other in the longitudinal direction.

27. The base frame according to claim 26,
wherein the connecting beam members in contact with and adjacent to each other in the longitudinal direction have height-direction dimensions equal to each other.

28. The base frame according to claim 26,
wherein the connecting beam members in contact with and adjacent to each other in the longitudinal direction are joined by welding to each other at least in part.

29. The base frame according to claim 21,
wherein the connecting beam member includes a substantially tubular square pipe having a rectangular cross section as a cross section perpendicular to an axial direction.

30. The base frame according to claim 21, further comprising:
a pair of frame base portions spaced apart from the pair of main beams on respective frame installation surface sides of the main beams and extending in the longitudinal direction; and
a strut provided between the main beam and the frame base portion,
wherein a disposition region of at least one of the connecting beam members overlaps a disposition region of the strut positioned on a frame installation surface side of the connecting beam in the longitudinal direction.

31. The base frame according to claim 20,
wherein a plate member disposed on the connecting beam and the connecting beam are joined by welding at least in part.

32. The base frame according to claim 20,
wherein end portions of the connecting beam are respectively joined by welding to inside surfaces of the pair of main beams in the width direction.

33. The base frame according to claim 20,
wherein each of the pair of main beams includes two main beam members joined by welding to each other.

34. A base frame used in an injection molding machine provided with a mold clamping unit including a platen, on which at least the mold clamping unit is placed and which supports the mold clamping unit, the base frame comprising:
a pair of main beams spaced apart from each other in a width direction of the base frame and extending side by side in a longitudinal direction of the base frame; and
a platen attachment plate which is disposed on the main beams and to which the platen is attached,
wherein outer edge portions of the platen attachment plate in the longitudinal direction include welding points joined by welding to the main beams, and the platen attachment plate has a shape in which a length in the longitudinal direction is longer at an outer end than at an inside part in the width direction,
at least one of the outer edge portions of the platen attachment plate includes a protruding edge portion protruding outward in the longitudinal direction beyond the inside part at an outside part including the outer end in the width direction,
the platen attachment plate includes a pair of platen fixing parts used for fixing to a pair of leg portions, respectively, the pair of platen fixing parts being located inside of an inside part in the longitudinal direction, and
the welding points of the outer edge portions of the platen attachment plate are positioned away from the platen fixing parts at least in a vicinity of the outer ends.

* * * * *